United States Patent
Takayama

(10) Patent No.: US 8,605,144 B2
(45) Date of Patent: Dec. 10, 2013

(54) IMAGING APPARATUS

(75) Inventor: Tomohiko Takayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 13/226,911

(22) Filed: Sep. 7, 2011

(65) Prior Publication Data

US 2012/0057014 A1 Mar. 8, 2012

(30) Foreign Application Priority Data

Sep. 8, 2010 (JP) ................. 2010-201280

(51) Int. Cl.
*H04N 7/18* (2006.01)

(52) U.S. Cl.
USPC ............................. 348/79; 359/368

(58) Field of Classification Search
USPC .............................. 348/79, E07.085; 359/368
See application file for complete search history.

(56) References Cited

FOREIGN PATENT DOCUMENTS

| JP | 2009-003016 A | 1/2009 |
|----|---------------|--------|
| JP | 2009-063656 A | 3/2009 |
| JP | 2009-063657 A | 3/2009 |
| JP | 2009-063658 A | 3/2009 |

OTHER PUBLICATIONS

Tsukamoto, Hiroyuki, Machine translation of patent JP 2009003016 A, Date: Jan. 2009, Translation Date: Sep. 5, 2013.*
U.S. Appl. No. 13/302,367, filed Nov. 22, 2011, Tomohiko Takayama, et al.
U.S. Appl. No. 13/302,349, filed Nov. 22, 2011, Tomohiko Takayama.

* cited by examiner

*Primary Examiner* — Hoon J Chung
*Assistant Examiner* — Umber Aggarwal
(74) *Attorney, Agent, or Firm* — Fitzpatrick, Cella, Harper & Scinto

(57) ABSTRACT

A plurality of image sensors are arranged so that each of odd rows is constituted by image sensors lined up in the X direction, and each of even rows is constituted by image sensors, more than that of the odd row by 1, lined up in the X direction at the same pitch as the odd row with a 1/2 phase shift with respect to the odd row. Light receiving areas of image sensors on both ends of the even row include both ends in the X direction of an imaging target area image respectively, and a length in the Y direction of an area covering the light receiving areas of the image sensors on the first row to the light receiving areas of the image sensors on the last row is longer than a length in the Y direction of the imaging target area image.

7 Claims, 22 Drawing Sheets

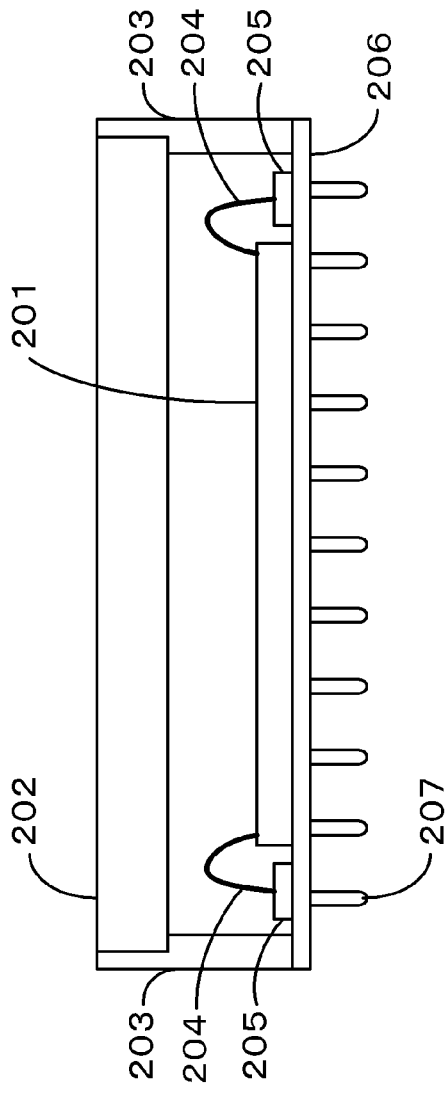
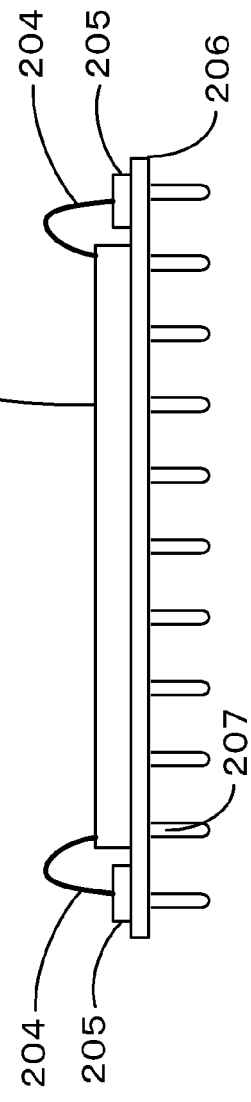

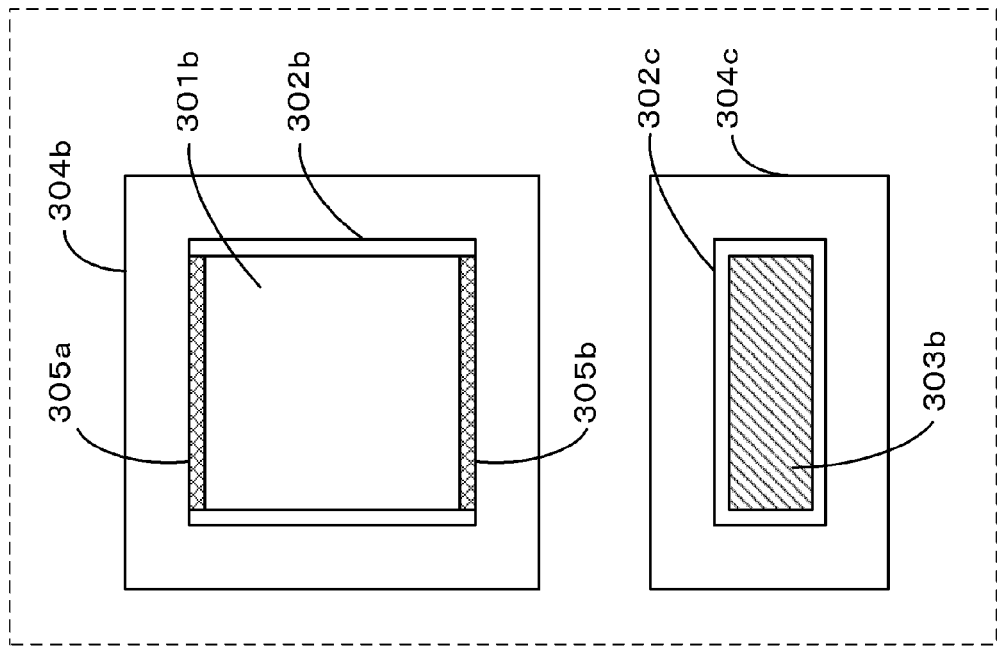
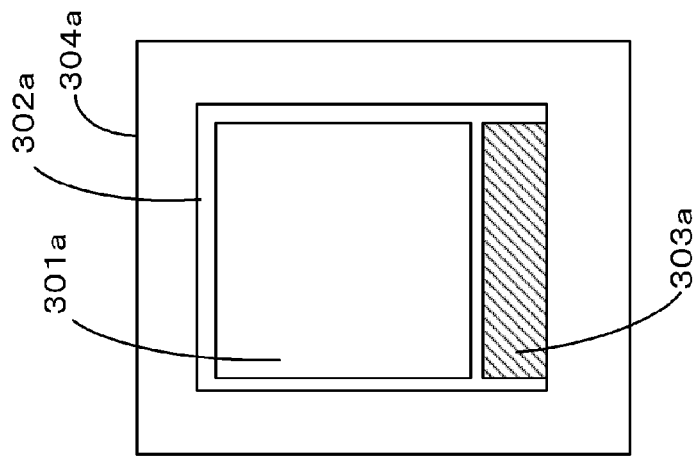

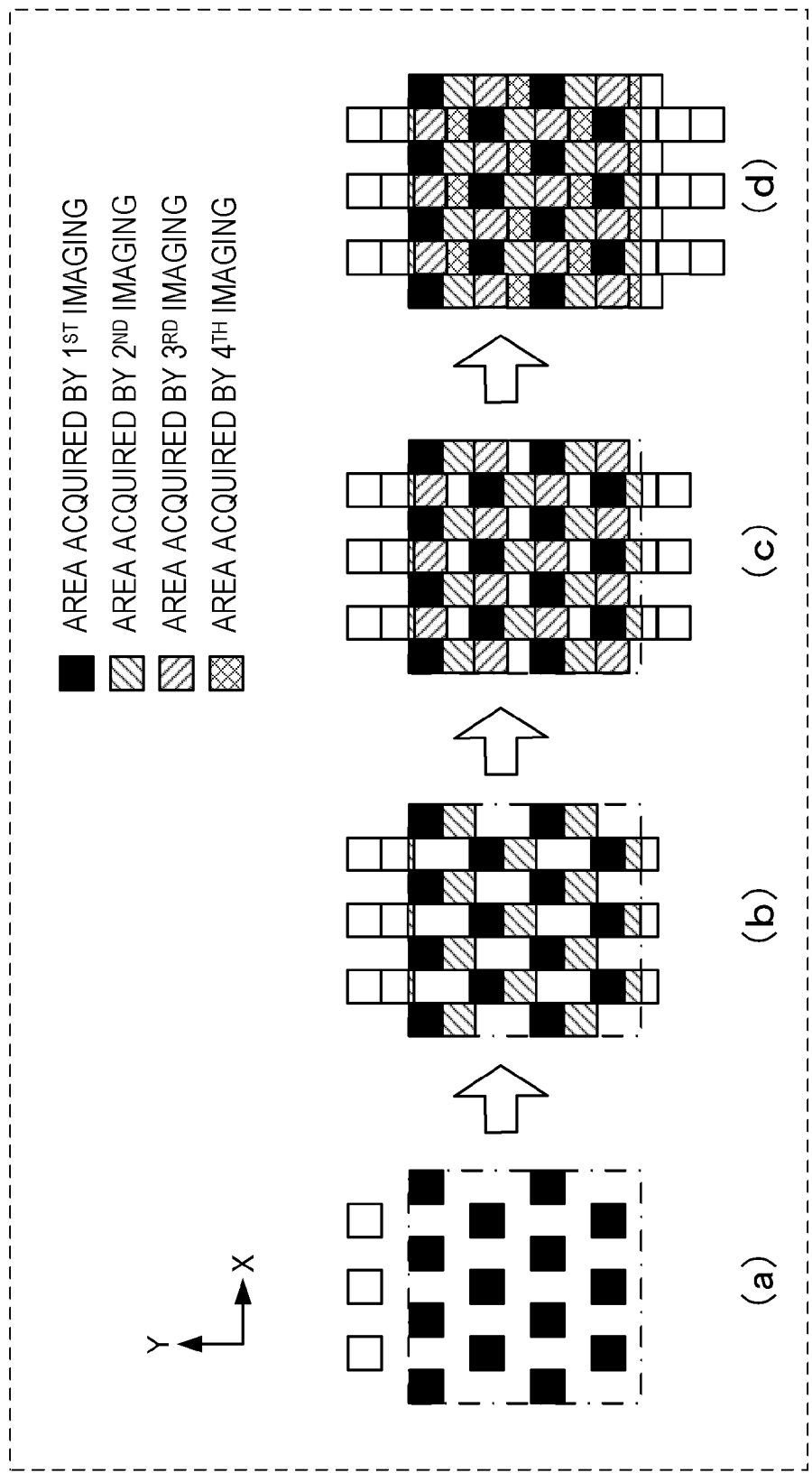

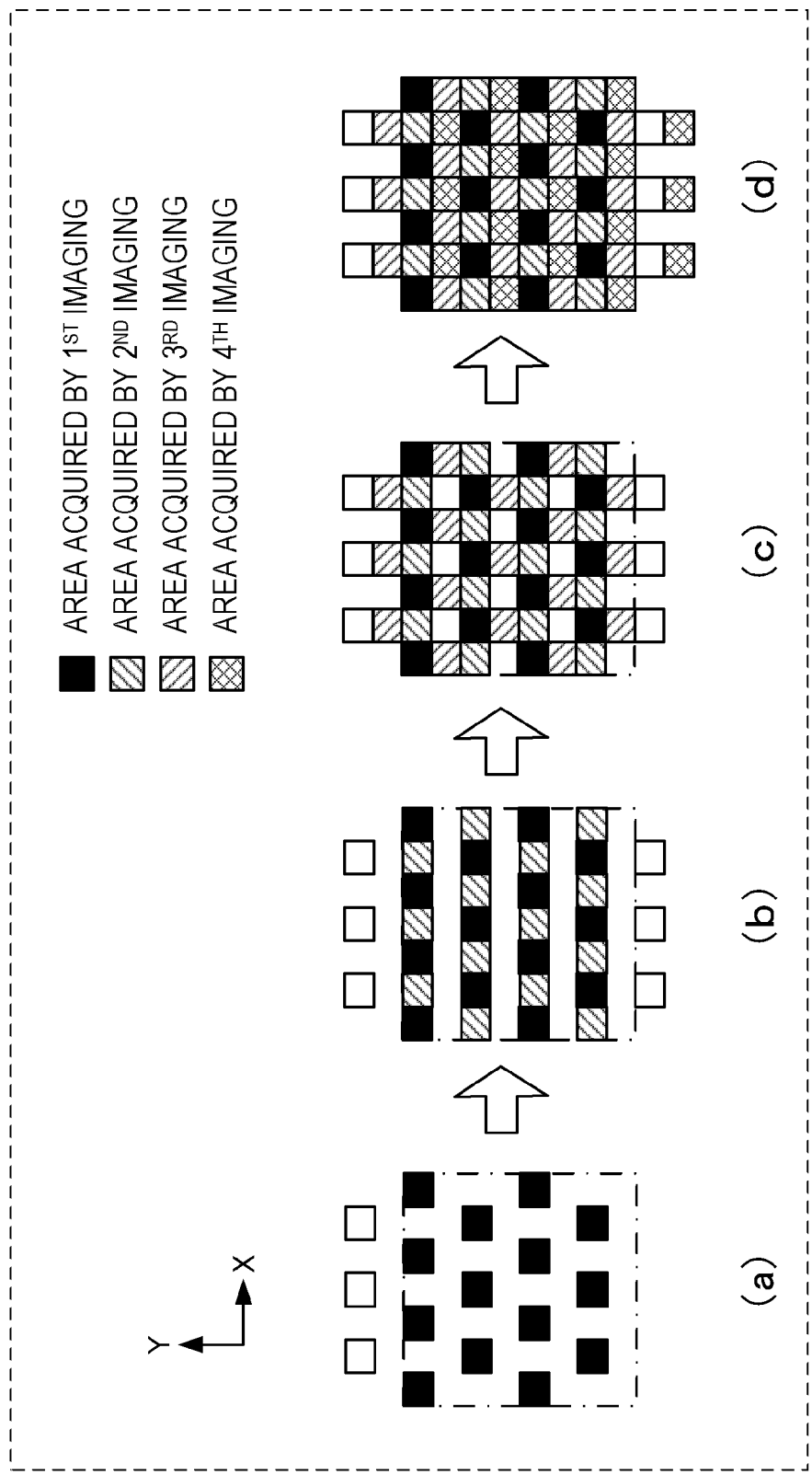

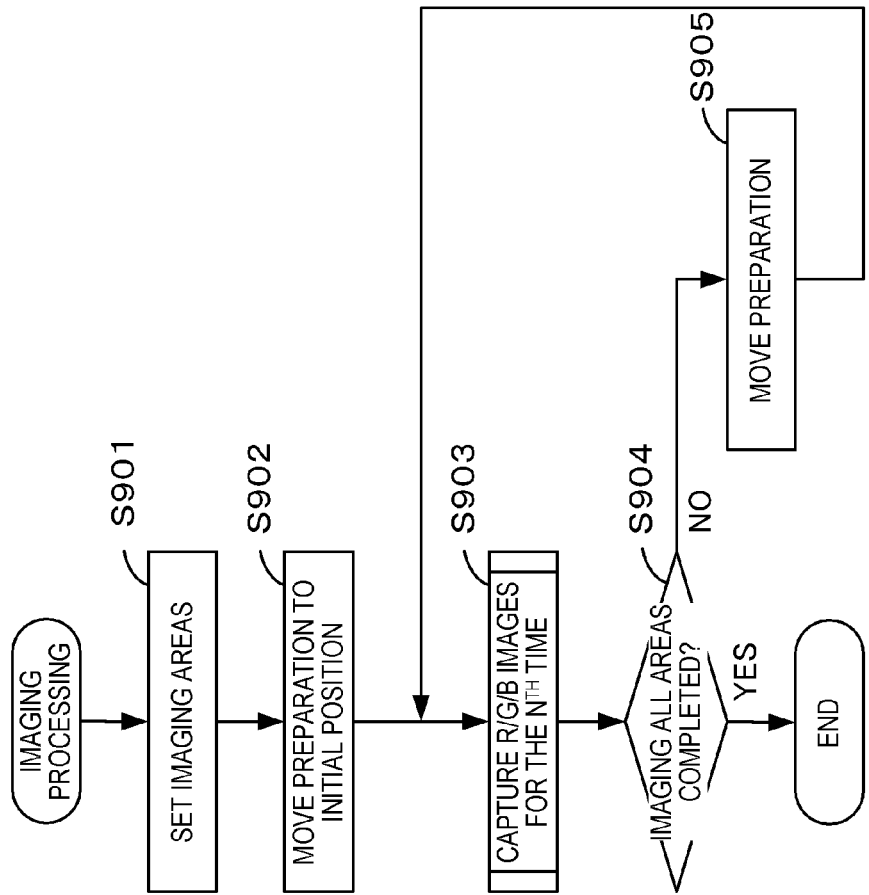
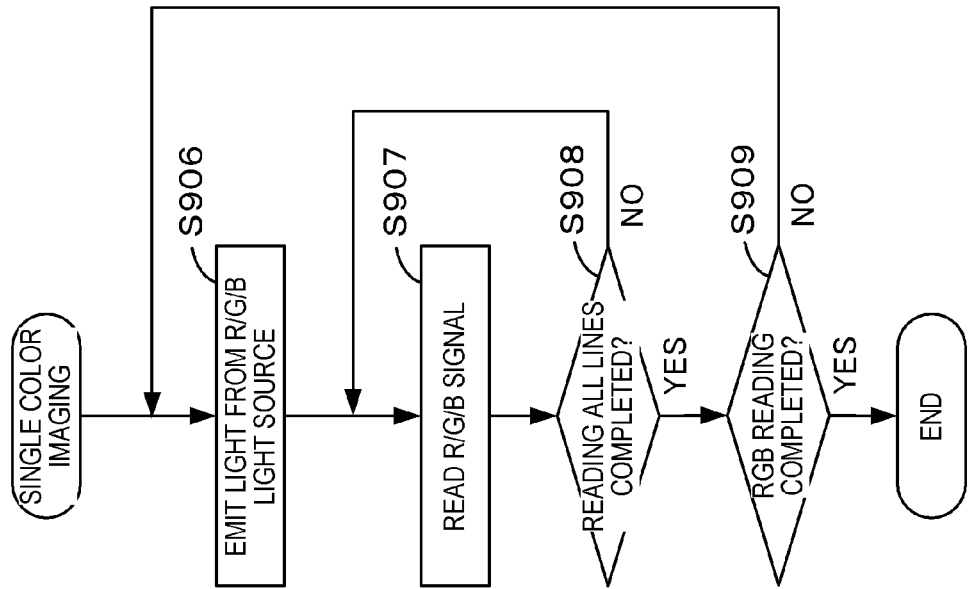

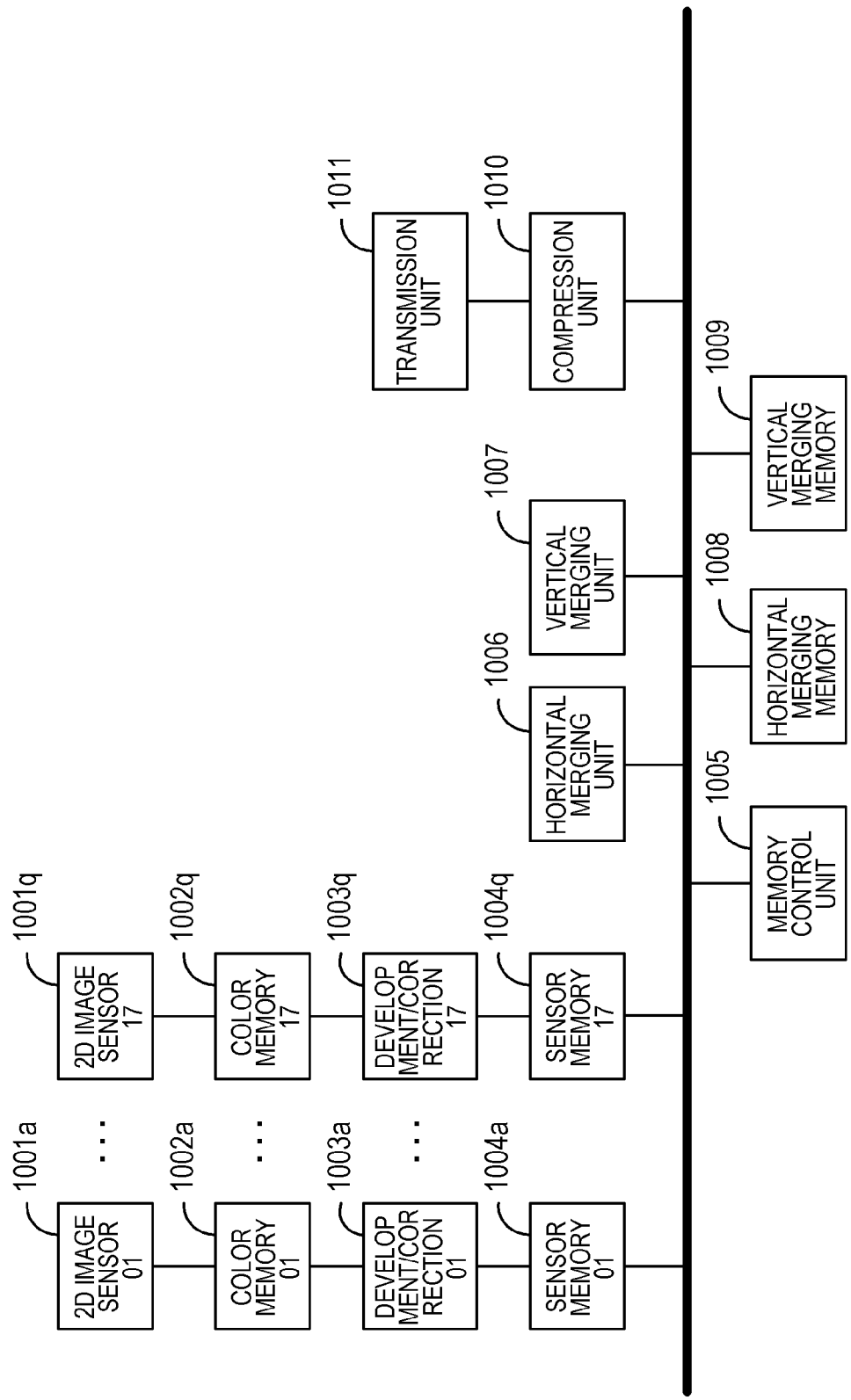

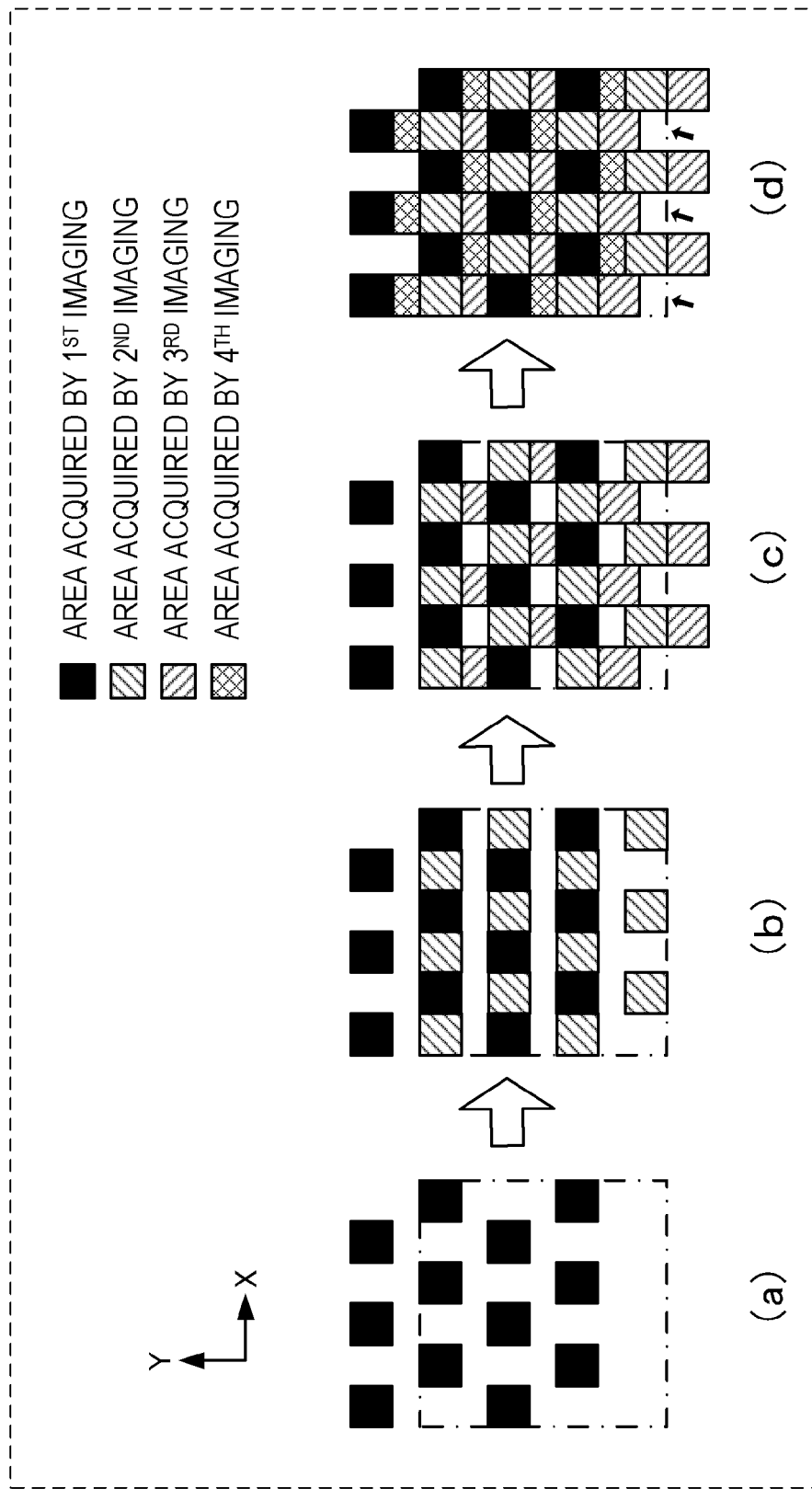

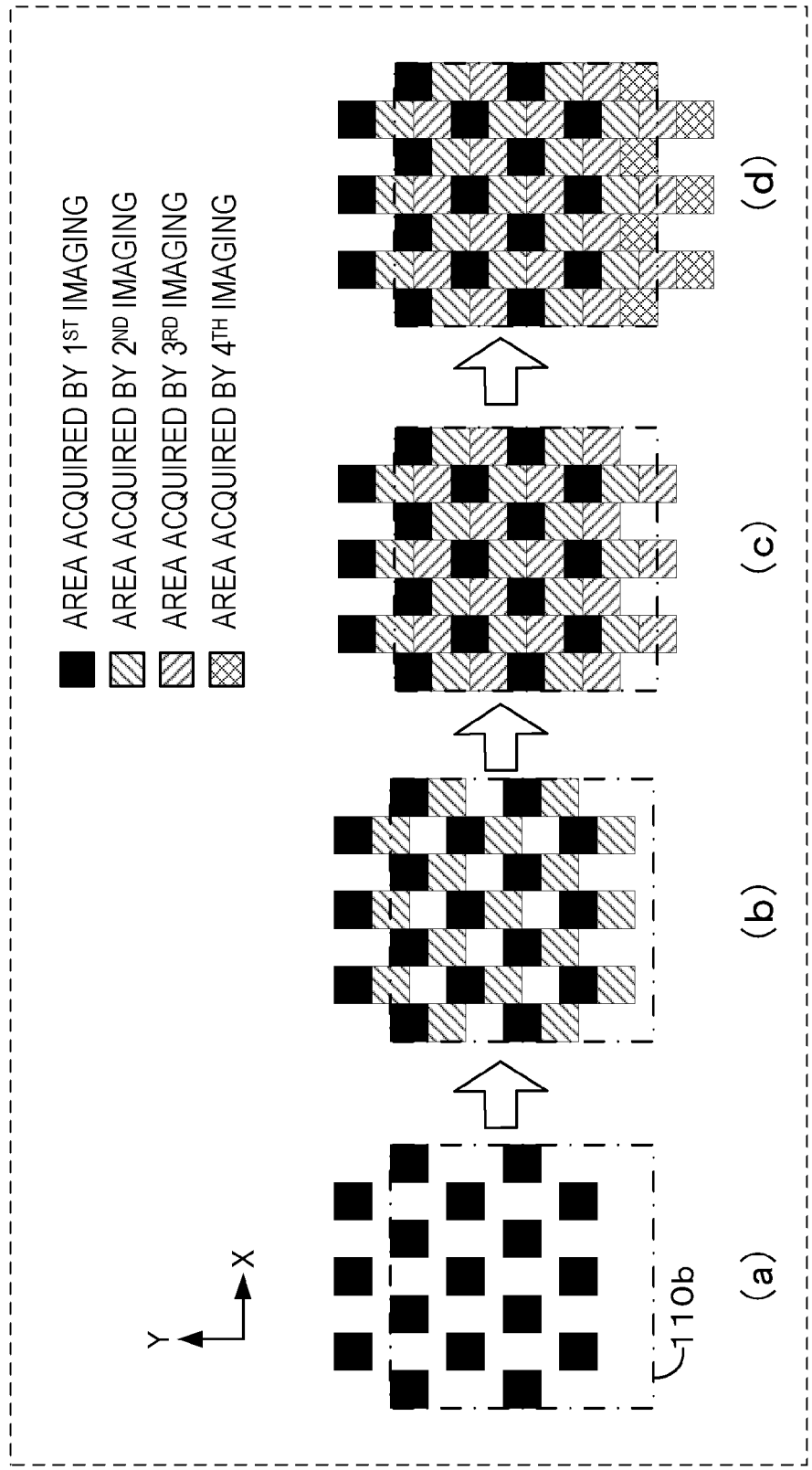

S/T>1.5

IMAGING APPARATUS

BACKGROUND OF THE INVENTION

1. Field of the Invention

The present invention relates to an imaging apparatus, and more particularly to an imaging apparatus which images a large screen using a plurality of two-dimensional image sensors which are discretely arranged.

2. Description of the Related Art

Recently in the pathology field, a virtual slide apparatus is attracting attention, which images a sample placed on a preparation, and digitizes the image, so as to make a pathological diagnosis on the display possible. By digitizing the image for pathological diagnosis by a virtual slide apparatus, the optical microscopic image of the sample on the preparation can be handled as digital data. The expected merits of this are a quick remote diagnosis, a description of diagnosis to a patient using digital images, the sharing of rare cases, and making education and practical training efficient.

In order to digitize the operation in the optical microscope using the virtual slide apparatus, the entire sample on the preparation must be digitized. By digitizing the entire sample, the digital data created by the virtual slide apparatus can be observed by viewer software, which runs on a PC and WS. Image sensors are used to digitize an optical image. In the case of corresponding 0.5 μm on the sample to one pixel of the image sensor, 900,000,000 pixels (30,000 pixels×30,000 pixels) are required to digitize the entire sample if the size of the sample on the preparation is 15 mm×15 mm. The size of an effective light receiving area demanded for the image sensor is 90 mm×90 mm if the magnification of an objective lens is 6 times, or is 120 mm×120 mm if the magnification is 8 times. A single unit two-dimensional multi-pixel large size image sensor that can implement this requirement has high cost. Therefore in a virtual slide apparatus, an area of the sample is normally divided into a plurality of areas, and imaged using a two-dimensional image sensor having several hundred thousand to several million pixels, or a one-dimensional image sensor having several thousand pixels.

The tiling method using one two-dimensional image sensor captures images of a test sample for a plurality of times while moving the two-dimensional image sensor relative to the test sample, and acquires the entire image of the test sample by pasting the plurality of captured images together without openings. A problem of the tiling method using a single two-dimensional image sensor is that it takes more time in capturing images as a number of divided areas increases in the sample.

As a technology to solve this problem, the following technology has been proposed (see Japanese Patent Application Laid-Open No. 2009-003016). Japanese Patent Application Laid-Open No. 2009-003016 discloses a technology which includes an image sensor group comprised of a plurality of two-dimensional image sensors disposed within the field of view of an objective lens, and images an entire screen by capturing the images a plurality of number of times while relatively changing the positions of the image sensor group and the position of the sample. Thereby the imaging time is decreased. Furthermore, the moving mechanism is simplified and the moving time is decreased by limiting the direction of the relative change between the position of the image sensor group and the position of the sample to a uniaxial direction.

In Japanese Patent Application Laid-Open No. 2009-003016, the restrictions in the arrangement using a plurality of two-dimensional image sensors is not referred to. Actually because of such restrictions as the silicon wafer size, the package size, the interference between packages, the sensor holding substrate and the sensor holding mechanism, the two-dimensional image sensors must be arranged with a dead zone there between. Particularly in the case of a two-dimensional image sensor up to several million pixels, a ratio of the dead zone, other than a light receiving area, with respect to the light receiving area, is high, and the influence of the restrictions is major. In the case of restricting the relative change of the positions of the image sensor group and the position of the sample to the uniaxial direction, and in the case of considering the above mentioned dead zone and the imaging target area being square (or a form close to square), the number of times of moving tends to increase and imaging takes time.

The moving mechanism can be simplified if the moving mechanism is disposed not at the two-dimensional image sensor group side, but at the preparation side, because the moving distance can be decreased since the optical magnification causes no influence. In the case of Japanese Patent Application Laid-Open No. 2009-003016, the two-dimensional image sensors are disposed outside the imaging target area image, hence the effective field of view of the imaging optical system must be increased if the moving mechanism is disposed at the preparation side, which leads to an increase in the size of the imaging optical system and an increase in cost.

SUMMARY OF THE INVENTION

With the foregoing in view, it is an object of the present invention to provide an apparatus for imaging a large view using a plurality of two-dimensional image sensors which are discretely disposed, wherein the imaging time is decreased by imaging the entire imaging target area with a minimum number of times of moving.

The present invention in its first aspect provides an imaging apparatus, including: a supporting plate which supports a sample; a light source which irradiates light onto an imaging target area on the supporting plate; an imaging unit on which a plurality of image sensors having a light receiving area respectively are discretely disposed on an image plane two-dimensionally in an X direction and a Y direction; an imaging optical system which guides light from the imaging target area and forms an imaging target area image corresponding to the imaging target area on the imaging plane of the imaging unit; a moving unit which relatively moves the imaging target area image and the plurality of image sensors in the Y direction in order to perform a plurality of times of imaging for the imaging target area image while changing a position of an imaging area of each of the image sensors; and a merging unit which merges images of imaging areas acquired by the plurality of times of imaging and generates an image of the entire imaging target area, wherein a size of an effective field of view of the imaging optical system is larger than a size of the imaging target area image, when x1 is a length in the X direction and y1 is a length in the Y direction of the imaging target area image, x2 is a length in the X direction and y2 is a length in the Y direction of the image sensor, and x3 is a length in the X direction and y3 is a length in the Y direction of the light receiving area, $1.5 < x2/x3 < 2.0$, $1.5 < y2/y3 < 2.0$, and $x3 \geq x1/m$ (m is 3 or greater odd number) are satisfied, the plurality of image sensors are arranged so that odd rows and even rows are alternately disposed in the Y direction at a pitch not less than y2 and not greater than $2 \times y3$, each of the odd rows being constituted by $(m-1)/2$ number of image sensors lined up in the X direction at $2 \times x1/m$ pitch, each of the even rows being constituted by $(m+1)/2$ number of image sensors lined up in the X direction at $2 \times x1/m$ pitch with a 1/2 phase shift with respect to the odd row, and the length in the Y direction of an area covering light receiving areas of the image sensors on the first row to the light receiving areas of the image sensors on the last row is longer than the length y1 in the Y direction of the imaging target area image.

The present invention in its second aspect provides an imaging apparatus, including: a supporting plate which supports a sample; a light source which irradiates light onto an imaging target area on the supporting plate; an imaging unit on which a plurality of image sensors having a light receiving area respectively are discretely disposed on an imaging plane two dimensionally in an X direction and a Y direction; an imaging optical system which guides light from the imaging target area and forms an imaging target area image corresponding to the imaging target area on an imaging plane of the imaging unit; a moving unit which relatively moves the imaging target area image and the plurality of image sensors in the Y direction in order to perform a plurality of times of imaging for the image target area image while changing a position of an imaging area of each of the image sensors; and a merging unit which merges images of imaging areas acquired by the plurality of times of imaging and generates an image of the entire imaging target area, wherein a size of an effective field of view of the imaging optical system is larger than a size of the imaging target area image, a size of the image sensor is larger than 1.5 times and smaller than 2 times a size of the light receiving area, the plurality of image sensors are arranged so that odd rows and even rows are alternately disposed in the Y direction at a predetermined pitch, each of the odd row being constituted by image sensors lined up in the X direction at a predetermined pitch, each of the even rows being constituted by image sensors, more than that of the odd row by 1, lined up in the X direction at the same pitch as the odd row with a 1/2 phase shift with respect to the odd row, light receiving areas of image sensors on both ends of the even row include both ends in the X direction of the imaging target area image respectively, and a length in the Y direction of an area covering the light receiving areas of the image sensors on the first row to the light receiving areas of the image sensors on the last row is longer than a length in the Y direction of the imaging target area image.

According to the present invention, the imaging time is decreased in an apparatus for imaging a large view using a plurality of two-dimensional image sensors which are discretely disposed, since the entire imaging target area can be imaged with a minimum number of times of moving.

Further features of the present invention will become apparent from the following description of exemplary embodiments with reference to the attached drawings.

BRIEF DESCRIPTION OF THE DRAWINGS

FIG. 2A and FIG. 2B are schematic diagrams depicting general configurations of a two-dimensional image sensor;

FIG. 3A and FIG. 3B are schematic diagrams depicting dimensions of a light receiving area and a dead zone of the two-dimensional image sensor;

FIG. 5A and FIG. 5B are schematic diagrams depicting an imaging procedure to image the entire imaging target area by a plurality of times of uniaxial imaging;

FIG. 7A to FIG. 7C are schematic diagrams depicting a number of pixels of an image sensor which enables simple control and configuration;

FIG. 9A and FIG. 9B are flow charts depicting a flow of imaging an entire imaging target area;

FIG. 10 is a functional block diagram depicting an image merging method;

FIG. 15A and FIG. 15B are schematic diagrams depicting an imaging procedure of a comparison example 1;

FIG. 16A and FIG. 16B are schematic diagrams depicting an imaging procedure of a comparison example 2.

DESCRIPTION OF THE EMBODIMENTS (Configuration of Imaging Apparatus)

Embodiments of the present invention will now be described with reference to the drawings.

Figure 1A:
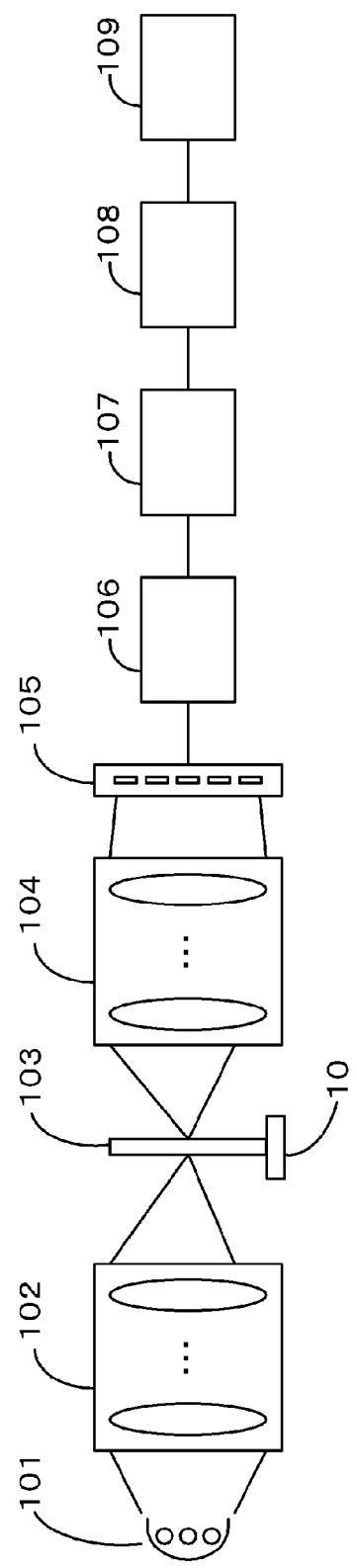
FIG. 1A to FIG. 1C are schematic diagrams depicting general configurations related to imaging of an imaging apparatus.
Figure 1C:
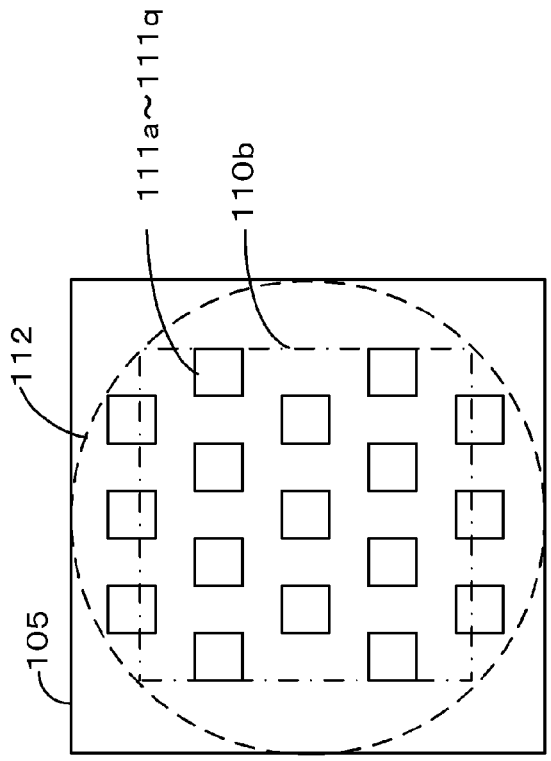
Figure 1B:
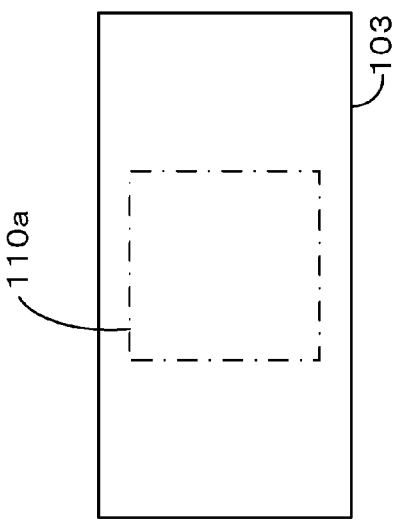

FIG. 1A to FIG. 1C are schematic diagrams depicting a general configuration related to imaging of an imaging apparatus. This imaging apparatus is an apparatus for acquiring an optical microscopic image of a sample on a preparation 103 as a high resolution digital image.

As FIG. 1A illustrates, the imaging apparatus is comprised of a light source 101, an illumination optical system 102, a moving mechanism 10, an imaging optical system 104, an imaging unit 105, a development/correction unit 106, a merging unit 107, a compression unit 108 and a transmission unit 109. The light source 101 is a means of generating illumination light for imaging, and a light source having emission wavelengths of three colors, RGB, such as an LED (Light Emitting Diode) and an LD (Laser Diode) can be suitably used. The light source 101 and the imaging unit 105 operate synchronously. The light source 101 sequentially emits the lights of RGB, and the imaging unit 105 exposes and acquires each RGB image respectively, synchronizing with the emission timings of the light source 101. One captured image is generated from each RGB image by the development/correction unit 106 in the subsequent step. The imaging sequence will be described in detail in FIG. 9 and FIG. 14. The illumination optical system 102 guides the light of the light source 101 efficiently to an imaging target area 110a on the preparation 103.

The preparation 103 is a supporting plate to support a sample to be a target of pathological diagnosis, and is a slide glass on which the sample is placed, and which is sealed with a cover glass using a mounting solution. FIG. 1B shows only the preparation 103 and the imaging target area 110a which is set thereon. The size of the preparation 103 is about 76 mm×26 mm, and the imaging target area is assumed to be 20 mm×20 mm here.

The imaging optical system 104 expands the transmitted light from the imaging target area 110a on the preparation 103, and guides the light and forms an imaging target area image 110b, which is a real image of the imaging target area 110a on the surface of the imaging unit 105. The effective field of view 112 of the imaging optical system 112 has a size that covers an image sensor group 111a to 111q, and the imaging target area 110b.

The imaging unit 105 is an imaging unit constituted by a plurality of two-dimensional image sensors which are discretely arrayed two-dimensionally in the X direction and the Y direction. FIG. 1C illustrates the positional relationships of the image sensor group 111a to 111q, the imaging target area image 110b on the imaging plane and the effective field of view of the imaging optical system. The positional relationship of the image sensor group 111a to 111q and the effective field of view 112 of the imaging optical system is fixed, but the relative position of the imaging target area image 110b on the imaging plane with respect to the image sensor group 111a to 111q and the effective field of view 112 changes by a moving mechanism 10, which is disposed at the preparation side. In the present embodiment, the moving axis is uniaxial, so that the moving mechanism has a simple configuration, lower cost and higher accuracy. In other words, a plurality of imaging is performed while moving the relative position of the image sensor group 111a to 111q and the imaging target area image 110b on the image plane in uniaxial direction (Y direction), and a plurality of digital data (RAW data) are acquired.

The development/correction unit 106 performs the development processing and the correction processing of the digital data acquired by the imaging unit 105. The functions thereof include black level correction, DNR (Digital Noise Reduction), pixel defect correction, brightness correction due to individual dispersion of image sensors and shading, development processing, white balance processing and enhancement processing. The merging unit 107 performs processing to merge a plurality of captured images which are output from the development/correction unit 106. The functions thereof include registration correction, feature point extraction, alignment, joint correction and gamma correction for an image after merging processing. The joint correction by the merging unit 107 is not performed for all the pixels, but only for an area where the merging processing is required. The merging processing will be described in detail with reference to FIG. 10 to FIG. 12.

The compression unit 108 performs sequential compression processing for each block image which is output from the merging unit 107. The transmission unit 109 outputs the signals of the compressed block image to a PC (Personal Computer) and WS (Workstation). For the signal transmission to a PC and WS, it is preferable to use a communication standard which allows large capacity transmission, such as gigabit Ethernet.

In a PC and WS, each received compressed block image is sequentially stored in a storage. To read a captured image of a sample, viewer software is used. The viewer software reads the compressed block image in the read area, and decompresses and displays the image on a display. By this configuration, a high resolution large screen image can be captured from about a 20 mm square sample, and the acquired image can be displayed.

(Imaging Unit)

Now imaging resolution, optical magnification, large screen imaging lens and image sensor size will be described using concrete numerical information, and the arrangement of the image sensor group, which is a primary subject of the present invention, will be described.

A size of a cell which is observed in pathological diagnosis is about several μm to several tens μm, hence about a several hundred nm order of resolution is required on the preparation. In the present embodiment, a configuration where one pixel of the image sensor corresponds to a 375 nm square on the preparation is described. Since a 20 mm square is assumed as an imaging target area, the imaging unit 105 requires at least 2.8 billion pixels (53 k pixels×53 k pixels).

As mentioned above, if the resolution on the preparation is fixed, the optical magnification of the imaging optical system and the pixel pitch of the imaging unit 105 is correlated, and if the pixel pitch is 3.0 μm, the optical magnification is 8 times, and if the pixel pitch is 3.75 μm, the optical magnification is 10 times. Decreasing the pitch of pixels of an image sensor, which can decrease the optical magnification, contributes to decreasing the size and cost of the imaging optical system. On the other hand, decreasing the pitch of pixels of the image sensor without dropping the image quality depends on the improvement of the semiconductor process and pixel structure. Therefore the optical magnification of the imaging optical system and the pixel pitch of the image sensors are determined so that a decrease in size and cost of the imaging optical system and image quality are balanced. In the present embodiment, a 3.0 μm pixel pitch and 8 times optical magnification are used for description.

In the case of the 8 times optical magnification, the imaging target area image 110b on the imaging plane is 160 mm×160 mm, and the diameter of the effective field of view 112 of the imaging optical system on the imaging plane on the imaging unit 105 is 226.3 mm. This shows that disposing the moving mechanism at the preparation 103 side rather than at the imaging unit 105 side can make it easier to decrease the moving distance that is controlled by the moving mechanism, and create a simpler mechanism.

Now an image sensor for capturing an 160 mm square imaging target area image 110b will be described. According to the present embodiment, a large screen imaging lens, which covers the 20 mm square imaging target area, is used, but if a two-dimensional multi-pixel large sized image sensor that can capture the 160 mm square imaging target area image 110b without dividing the area is used, pixel defect causes a major drop in yield, and cost becomes high, as mentioned above. Therefore it is practical to use a plurality of two-dimensional image sensors, with dividing the 160 mm square imaging target area image 110b to capture an image. On the other hand, it is preferable that the size of each image sensor is as large as possible in order to minimize image quality deterioration due to the merging processing in a subsequent step.

With the foregoing in view, it is practical to dispose the image sensor group 111a to 111q (the light receiving areas thereof) of the imaging unit 105 within the effective field of view 112 of the imaging optical system.

In this case, the image sensors are roughly divided into image sensors located at the outer circumference side and the image sensors located at the inner side, surrounded by adjacent image sensors. Here if an area other than the light receiving area is defined as a dead zone, it is not necessary to consider the dead zone very much for the image sensors located at the outer circumference side if the dead zone is positioned outside the image target area image 110b, for example. However, the location of the dead zone must be considered for the inner image sensors, since these image sensors are surrounded by other image sensors.

With the foregoing in view, a configuration to allow imaging the imaging target area, with a minimum number of times of moving by appropriately disposing the image sensor group with considering the dead zones, is proposed, under the conditions of the large screen imaging lens, uniaxial moving of the preparation, and the square (or a shape close to square) imaging target area.

(Configuration of Image Sensor)

FIG. 2A is a schematic diagram depicting a general configuration of a two-dimensional image sensor.

FIG. 2A is a cross-sectional view when the two-dimensional image sensor is viewed from a side face. The two-dimensional image sensor is comprised of a die 201, a glass 202, a molding resin 203, bonding wires 204, interposer electrodes 205, an interposer 206 and pins 207. The die 201 is generated by dicing a silicon wafer.

A light receiving area, a read circuit for reading an imaged analog signal, a CDS circuit for reducing read noise, an AD conversion circuit for converting analog signals into digital signals, an interface circuit for reading imaged signal among others are formed on the die 201. The glass 202 is for protecting the die 201, the bonding wires 204 and the connections thereof from impact, so as to ensure guiding light to the light receiving area of the two-dimensional image sensor. The molding resin 203 is for protecting the die 201, the bonding wires 204 and the connections thereof from impact and external light. The bonding wire 204 is for connecting the die 201 and the interposer electrodes 205. The interposer 206 is a substrate which interposes the electrical connections between pins 207 which are external terminals and the die 201. The pins 207 are external terminals for connecting with an external substrate, and are arrayed in a lattice, just like a needle-point flower arrangement holder.

FIG. 2B is a cross-sectional view when a two-dimensional image sensor having a different configuration is viewed from a side face. The two-dimensional image sensor in FIG. 2B has the configuration in FIG. 2A, from which the glass 202 and the molding resin 203 are removed. By removing the protective members, the interposer 206 can be shorter, and the overall dimensions can be kept small.

FIG. 3A and FIG. 3B are diagrams depicting dimensions of a light receiving area and a dead zone of a two-dimensional image sensor.

FIG. 3A is a schematic diagram when the two-dimensional image sensor is viewed from the top face. The dimensions related to a light receiving area 301a, a die 302a, a circuit unit 303a and a package frame 304a will be described. The die 302a is equivalent to the die 201 described in FIG. 2A, and the effective light receiving area 301a and the circuit unit 303a are formed on the die 302a. The circuit unit 303a includes a CDS circuit for reducing read noise, an AD conversion circuit for converting analog signals into digital signals, and an interface circuit for reading imaged signals.

Now the dimensions will be described using concrete numerical information. If a 160 mm square imaging target area image 110b on the imaging plane is divided into 7×7 blocks, one block is 22.9 mm×22.9 mm. If this one block is corresponded to each light receiving area of a single image sensor, and 64 pixels are secured around the two-dimensional image sensor as pixels for merging processing in subsequent steps, then the light receiving area 301a of a single image sensor becomes 23.3 mm×23.3 mm. The size of the die 302a is about 32.8 mm×26.8 mm, considering the size of the circuit unit 303a. The package frame 304a is about 44.5 mm×37.5 mm due to the relationship with the die 201 and the interposer 206 described in FIG. 2A. In other words, in the two-dimensional image sensor, the ratio of the dimensions in the long axis direction between the package frame, including the dead zone, and the light receiving area is 1.91:1 (=44.5:23.3). The numerical values shown here, however, are an example, and the size of the circuit unit 303a, for example, changes depending on the resolution of the AD conversion circuit, and the size of the light receiving area 301a changes depending on the pixel pitch.

FIG. 3B is an example of configuring a circuit group, which corresponds to the CDS circuit, the AD conversion circuit and the interface circuit of the circuit unit 303a in FIG. 3A, as a different die. This image sensor is comprised of two packages: a light receiving unit package which is comprised of a light receiving area 301b, a die 302b, a package frame 304b and analog output circuit units 305a and 305b; and an output unit package which is comprised of a die 302c, a circuit unit 303b and a package frame 304c. The light receiving area 301b is 23.3 mm×23.3 mm, just like FIG. 3A. The die 302b is about 26.8 mm×26.8 mm, considering the sizes of the analog output circuit units 305a and 305b. The package frame 304b is about 37.5 mm×37.5 mm. In other words, in the two-dimensional image sensor, the ratio of the dimensions in the package frame, including the dead zone and the light receiving area in the axial direction is 1.61:1 (=37.5:23.3).

Now additional description is provided on the image sensors described in FIG. 3A and FIG. 3B. In the present embodiment, it is assumed that the pixel pitch is 3.0 μm, so the above mentioned one block (22.9 mm×22.9 mm) has 7624 pixels×7624 pixels. If 128 pixels, that is an overlapped area for merging processing, are added to this, a number of pixels of the light receiving area is 60 M pixels (7752 pixels×7752 pixels).

(Arrangement of Image Sensors)

Figure 4:
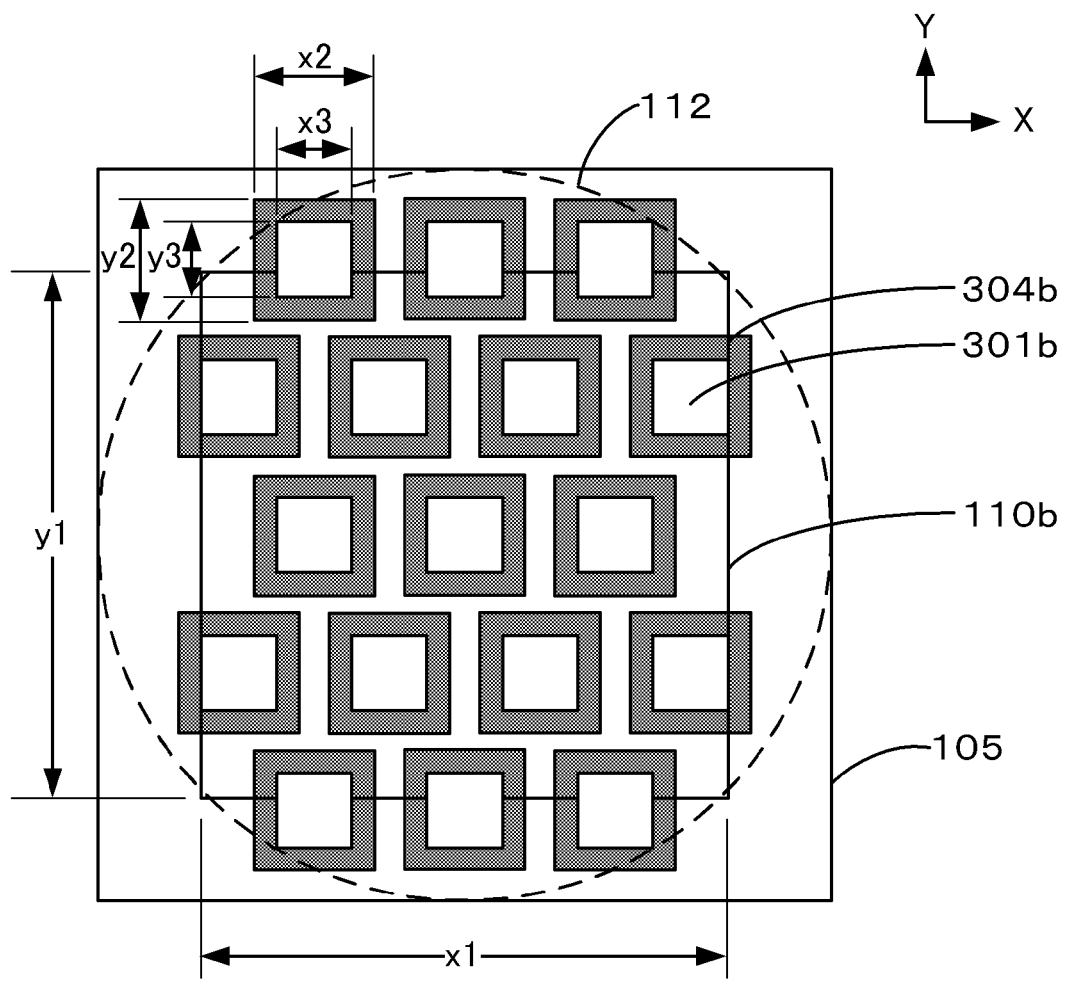
FIG. 4 is a schematic diagram depicting an arrangement using a plurality of image sensors.

FIG. 4 is a schematic diagram depicting an arrangement of a plurality of image sensors. This is the same as FIG. 1C, but the package frame 304b is illustrated more clearly. The size of the package frame 304b is based on the assumption that the two-dimensional image sensor is comprised of two packages, as described in FIG. 3B. The output unit package, which is not illustrated, is disposed at the rear side in the depth direction with respect to the light receiving area of the light receiving unit package. In this case, the ratio of the dimensions in the package frame 304b and the light receiving area 301b in the axis direction of the two-dimensional image sensor is 1.61:1.

If the size of the package frame 304b is larger than 1.5 times that of the light receiving area 301b, the arrangement of the image sensors must be considered in order to image the entire imaging target area by 4 or less number of times of imaging (described in detail later with reference to FIGS. 16A, 16B and FIGS. 17A, 17B). Hence according to the present embodiment, the following arrangement of image sensors is used.

To simplify description, it is assumed that x1 is the length of the imaging target area image 110b in the X direction, y1 is the length thereof in the Y direction, x2 is the length of the image sensor (package frame 304b) in the X direction, y2 is the length thereof in the Y direction, x3 is the length of the light receiving area 301b in the X direction, and y3 is the length thereof in the Y direction. A condition to apply this arrangement is that the size of the image sensor is larger than 1.5 times and smaller than 2 times the size of the light receiving area 301b, that is, $1.5 < x2/x3 < 2.0$ and $1.5 < y2/y3 < 2.0$. This is because if the size of the image sensor is 1.5 times or less, there is no need to consider arrangement (see FIG. 16A), and if 2.0 times or more, this arrangement cannot be implemented since the adjacent image sensors in the X direction interfere with each other.

As FIG. 4 shows, the imaging target area image 110b is divided in m columns (m is 3 or higher odd number) in a direction (X direction) that is orthogonal to the moving direction (Y direction), and a plurality of image sensors are disposed alternately in each column so that the image sensors do not interfere with one another. FIG. 4 is an example when m=7. In each column, the image sensors are disposed extending out from the imaging target area image 110b, along the moving direction (Y direction) (at least a part of the light receiving area 301b of the image sensor must be inside the effective field of view 112). In this case, the values of x3, which is a width of the light receiving area 301b in the X direction, and the value m, are set so as to satisfy x3≥x1/m, in order that the light receiving area 301b of each image sensor covers the imaging area of each column. x1/m corresponds to the width of the imaging area in each column in the X direction, and the difference between the width x3 of the light receiving area 301b and the width of the imaging area (x1/m) corresponds to the width of the overlapped area for the merging processing.

In other words, in the image sensor group of the present embodiment, an odd row constituted by (m−1)/2 number of image sensors lined up in the X direction at a predetermined pitch, and an even row constituted by (m+1)/2 number of image sensors lined up in the X direction at a predetermined pitch are alternately arrayed. The phase of the odd row and that of the even row are shifted by 1/2 phase, and a light receiving area 301b of the odd row is located between adjacent light receiving areas 301b of the even row. The pitch in the X direction of each row is set to 2×x1/m, and the light receiving areas on both ends of the even row include both ends in the X direction of the imaging target area image 110b respectively. The pitch in the Y direction of each row is set to y2, that is the length in the Y direction of the image sensor, or more, and to 2×y3, that is 2 times of the length y3 in the Y direction of the light receiving area 301b, or less. This is because if the pitch in the Y direction becomes less than y2, the image sensors in the odd row and those in the even row interfere, and if the pitch in the Y direction becomes greater than 2×y3, then the interval between the light receiving areas in a same column become wider than a space equivalent to the three light receiving areas, and the number of times of imaging cannot be 4 times or less. The length in the Y direction of the area from the light receiving area of the first row of the image sensors to the light receiving area of the image sensors in the last row is longer than the length y1 in the Y direction of the imaging target area image 110b (in other words, at least one of the first row and the last row extend out from the imaging target area image 110b).

By using this arrangement, the entire imaging target area can be imaged by 4 times of the imaging (3 times moving the preparation) in the case of FIG. 4.

(Imaging Procedure of Imaging Target Area)

Figure 5A:
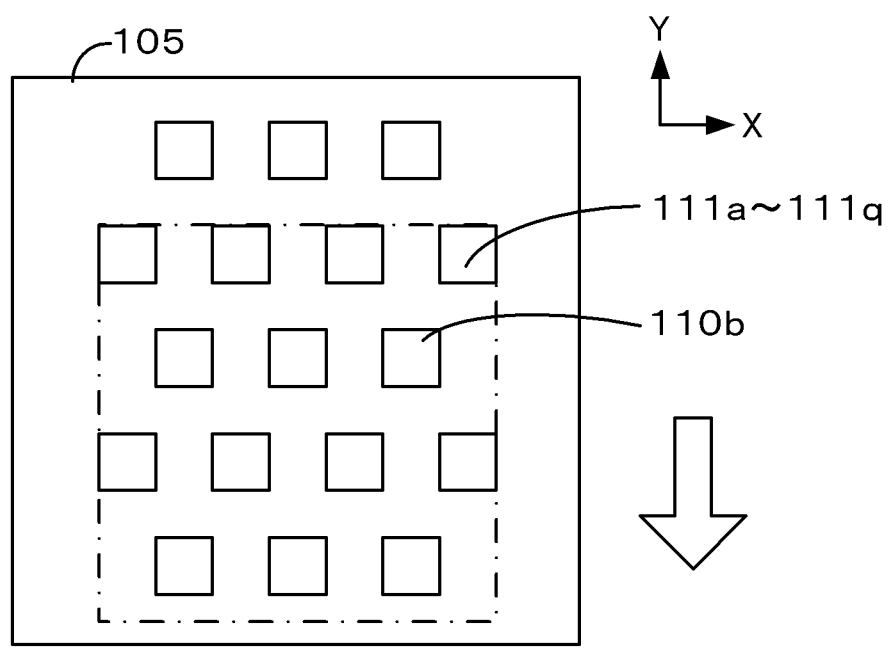

FIG. 5A and FIG. 5B are schematic diagrams depicting a flow of imaging the entire imaging target area with a plurality of times of uniaxial imaging.

FIG. 5A illustrates a positional relationship of the image sensor group 111a to 111q and the imaging target area image 110b on the imaging plane. The relative positions of the image sensor group 111a to 111q and the imaging target area image 110b on the imaging plane change in the arrow direction (Y direction) by the moving mechanism disposed at the preparation side. FIG. 5B is a diagram depicting how the image sensor group 111a to 111q capture the imaging target area image 110b.

(a) in FIG. 5B shows an area acquired by the first imaging in solid black. In the imaging positions of the first imaging, each image of RGB is acquired by switching the emission wavelength of the light source. (b) in FIG. 5B shows an area acquired by the second imaging after the preparation is moved by the moving mechanism in slashes (slants to the left). (c) in FIG. 5B shows an area acquired by the third imaging as inverted slashes (slants to the right). (d) in FIG. 5B shows an area acquired by the fourth imaging in mesh.

Thereby the image sensor group can image the entire imaging target area without spaces by 4 times of imaging (the preparation is moved by the moving mechanism 3 times).

Figure 6:
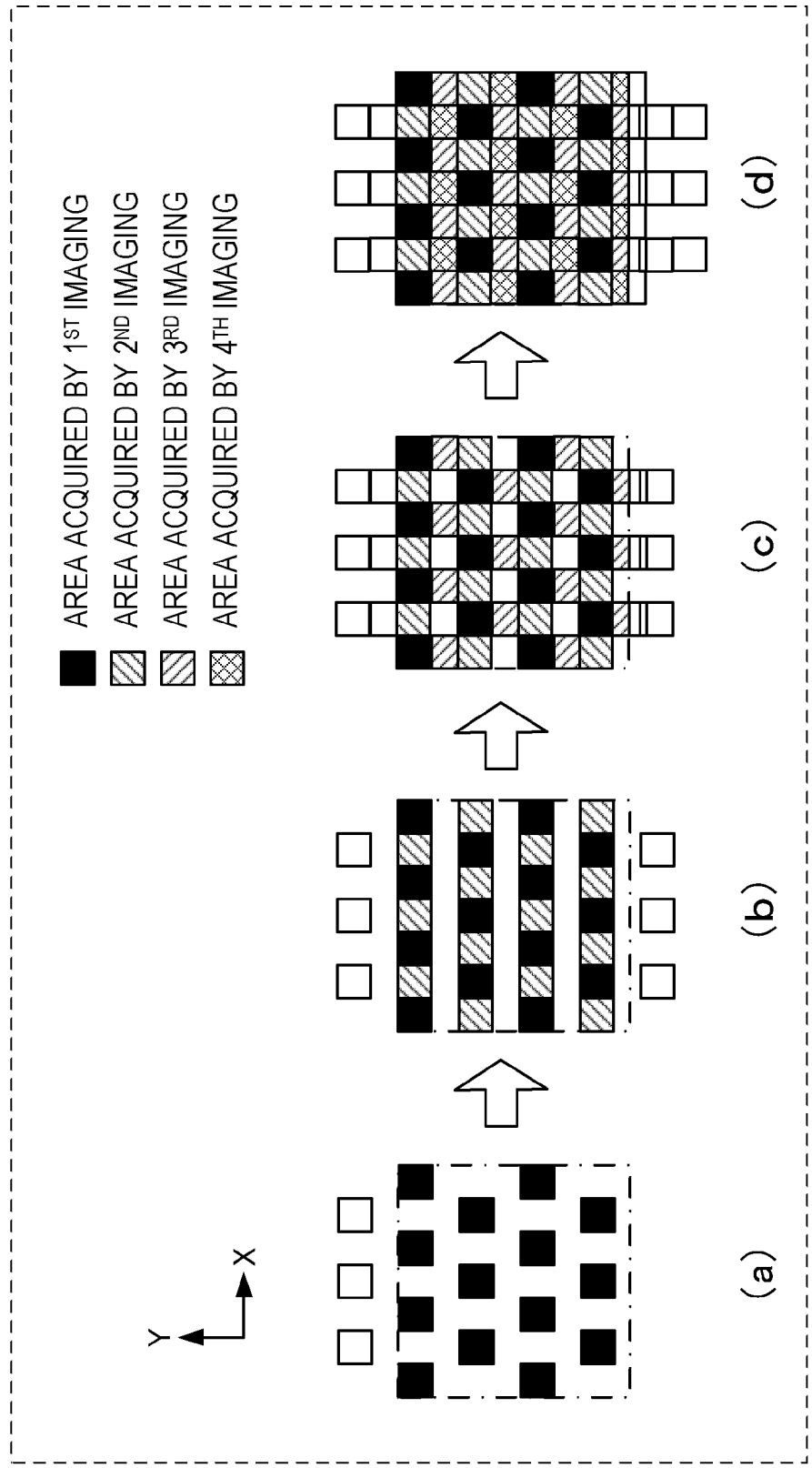
FIG. 6 is a schematic diagram depicting an imaging procedure suitable for merging images.

FIG. 6 is a schematic diagram depicting a flow of imaging the entire imaging target area by a plurality of times of uniaxial imaging considering the image merging. (a) to (d) of FIG. 6 correspond to (a) to (d) of FIG. 5B, but the moving amount of the preparation by the moving mechanism is different. In order to execute the merging processing in the subsequent step using a simple sequence, the horizontal reading direction (X direction) of the image sensors and the moving direction (Y direction) are perpendicular, and the positions in the Y direction of the imaging areas, which are adjacent in the X direction, are roughly the same, and a number of pixels to be read in the Y direction thereof are also the same. The image sensor group 111a to 111q and the imaging target area image 110b on the imaging plane are controlled to move relatively, so that the image sensor group sequentially fill the imaging target area images along the Y direction. The merging processing will be described in detail with reference to FIG. 10 to FIG. 12.

(a) in FIG. 6 shows an area acquired by the first imaging in solid black. (b) in FIG. 6 shows an area acquired by the second imaging after the preparation is moved by the moving mechanism in slashes (slants to the left). (c) in FIG. 6 shows an area acquired by the third imaging in inverted slashes (slants to the right), and (d) in FIG. 6 shows an area acquired by the fourth imaging in mesh.

In (d) of FIG. 5B, the merging processing is required for 96 locations in the horizontal direction (X direction) and for 52 locations in the vertical direction (Y direction). In (d) of FIG. 6, on the other hand, the merging processing is required for 48 locations in the horizontal direction, and for 49 locations in the vertical direction. This means that in the case of the reading method shown in FIG. 6, a number of times of merging processing in the subsequent step is less, and the sequence of the merging processing can be simplified.

(Preferred Number of Pixels of Image Sensor)

Figure 7A:
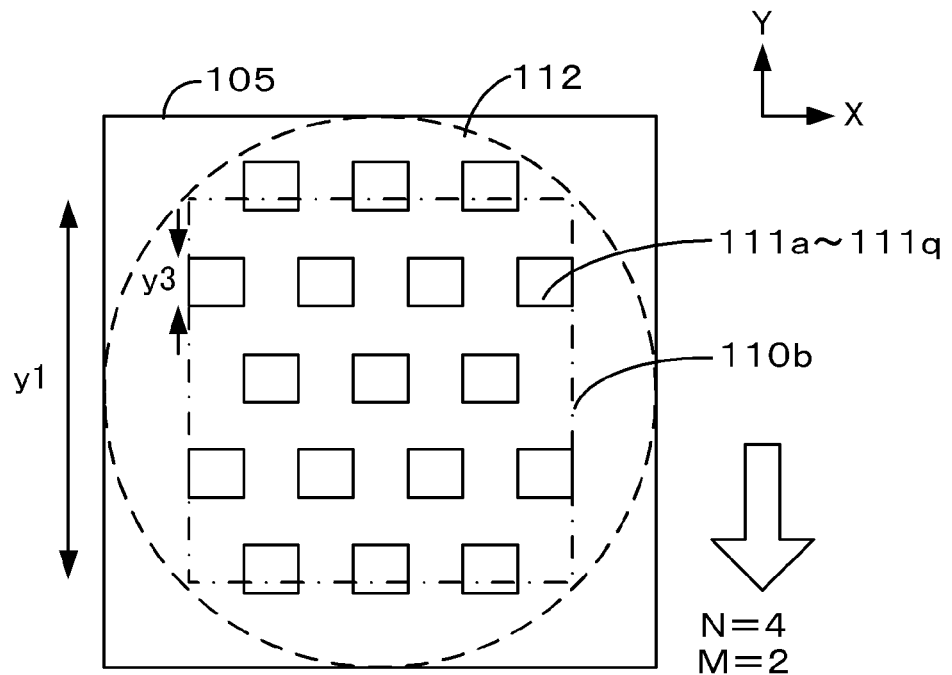
Figure 7B:
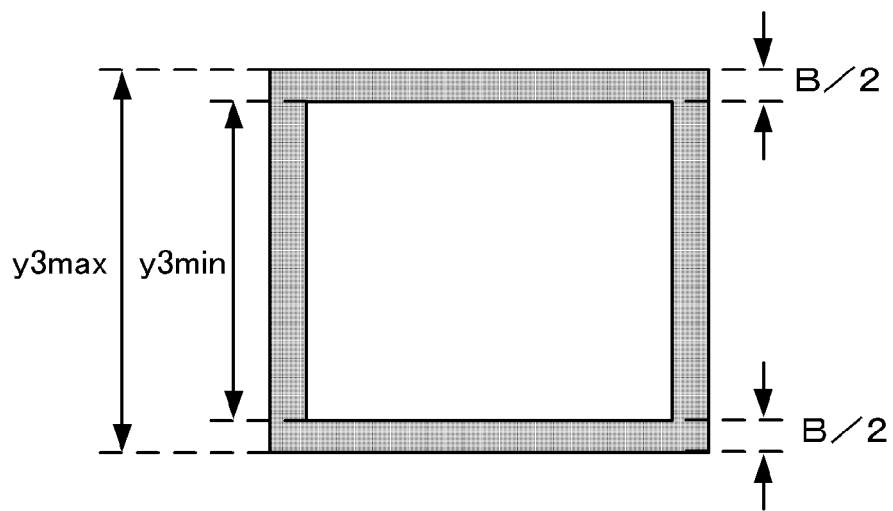

FIG. 7A to FIG. 7C are schematic diagrams depicting a number of pixels of image sensors which allow a simple control and sample configuration.

FIG. 7A illustrates a positional relationship of the image sensor group 111a to 111q, effective field of view 112 of the imaging optical system, and the imaging target area image 110b on the imaging plane. The difference from FIG. 5A is length in the Y direction, that is, a number of pixels, of the individual light receiving area.

FIG. 7B illustrates a number of pixels in the moving axis direction (Y direction) for the merging processing in the subsequent step as an overlapped area B. In the present embodiment, B/2 is created as the overlapped area B, at the top and bottom respectively in the moving axis direction. The overlapped area is required for alignment processing and joint correction when a plurality of images are merged. A concrete example of the overlapped area will be described later with reference to FIGS. 11A and 11B.

As FIG. 7A and FIG. 7B shows, in the case of imaging the entire imaging target area with N number of times of imaging (N>2), the length y3 in the Y direction of the light receiving area is given by $$y1/(M \times N) \leq y3 \leq y1/(M \times N) + B, M: \text{positive number}$$

where y1 is a length in the moving axis direction of the imaging target area image 110b, and B is a maximum overlapped area for merging processing.

M is a number of image sensors in any one column in the moving axis direction, and if the number of image sensors is different depending on the column, the smallest number is selected. According to the present embodiment, a number of image sensors in an odd column is 2, and a number of image sensors in an even column is 3, therefore M=2. M can also be defined as "a number of image sensors in an even row of the image sensor group" or "a number of images sensors in an odd column of the image sensor group". (M×N) indicates a number of sections when the length y1 in the moving axis direction of the imaging target area image is divided by one light receiver area, and if the overlapped area is not considered, y3=y1/(M×N) is a minimum light receiving area size required for generating the image.

If concrete numerical information is applied here, y1=160 mm, N=4 times, M=2, and B=0.384 mm (128 pixels×0.003 mm) in the case of the present embodiment, therefore $$20\ mm \le y \le 20.384\ mm$$

If this is converted into a number of pixels then $$6671\ (pixels) \le y3\ (pixels) \le 6799\ (pixels)$$

Since y1=160 mm is divided into 7 using image sensors of which pixel pitch is 3 µm, the length in the moving axis direction of the imaging target area image is regarded not as 160 mm, but as 160.104 mm (53368 pixels with pixel pitch 3 µm) upon converting to a number of pixels, so that the number of pixels after the division becomes an integer.

(a) in FIG. 7C shows an area acquired by the first imaging in solid black. (b) in FIG. 7C shows an area acquired by the second imaging after the preparation is moved by the moving mechanism in slashes (slants to the left). (c) in FIG. 7C shows an area acquired by the third imaging as the inverted slashes (slants to the right), and (d) in FIG. 7C shows an area acquired by the fourth imaging in mesh. Unlike FIG. 5B and FIG. 6, the area imaged as overlapping can be decreased, so the control and circuits in the subsequent step can be simplified.

By specifying the length (number of pixels) in the Y direction of the image sensor like this, a number of pixels of the image sensor can be set to a value appropriate for image generation, and control and configuration can be simplified.

Figure 8:
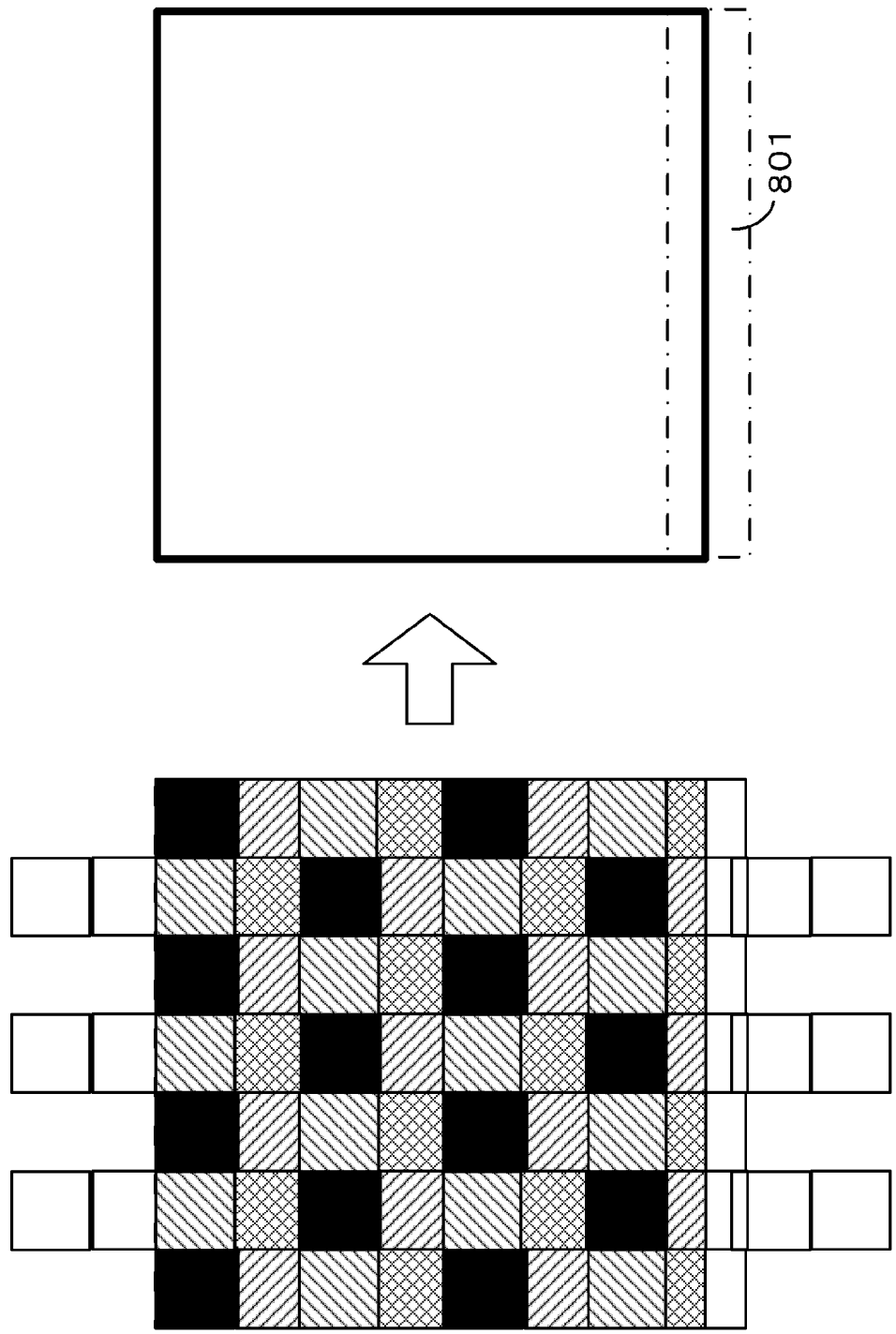
FIG. 8 is a diagram depicting an imaging area.

FIG. 8 is a diagram depicting the imaging area. FIG. 8 shows an image of the entire imaging target area imaged a plurality of times, as described in FIG. 6. Thus far, a 160 mm×160 mm square area was considered as the imaging target area image 110b on the imaging plane, but in terms of the image area covered by 4 times of imaging, the imaging target area need not be a square, but may be a rectangular area. The area enclosed by the dashed line 801 can be regarded as a margin, and a number of times of imaging is not affected even if the imaging area is increased/decreased within this range.

(Flow of Imaging Processing)

FIG. 9A and FIG. 9B are flow charts depicting a flow of imaging an entire imaging target area. FIG. 9A shows a processing flow to image the entire imaging target area by a plurality of times of imaging.

In step S901, an imaging area is set. A 20 mm square area is assumed as the imaging target area, and the position of the 20 mm square area is set according to the position of the sample on the preparation.

In step S902, the preparation is moved to the initial position where the first imaging (N=1) is executed. In the case of FIG. 6, for example, the preparation is moved so that the relative position of the image sensor group 111a to 111q and the imaging target area image 110b on the imaging plane becomes the state shown in (a) of FIG. 6.

In step S903, each image of RGB is captured for the Nth time.

In step S904, it is determined whether imaging of the entire imaging target area is completed. If the imaging of the entire imaging target area is not completed, processing advances to S905. If the imaging of the entire imaging target area is completed, that is, if N=4 in the case of this embodiment, the processing ends.

In step S905, the moving mechanism moves the preparation so that the relative position of the image sensor group and the imaging target area image becomes a position for executing imaging for the Nth time (N>2).

FIG. 9B shows a detailed processing flow of the single color image capturing processing in S903. In the present embodiment, a case of using the rolling shutter type image sensors will be described.

In step S906, emission of a single color light source (R light source, G light source or B light source) is started, and the light is irradiated onto the imaging target area on the preparation.

In step S907, the image sensor group is exposed, and single color image signals (R image signal, G image signals or B image signals) are read. Because of the rolling shutter method, the exposure of the image sensor group and the reading signals are executed line by line. The lighting timing of the single color light source and the exposure timing of the image sensor group are controlled so as to operate synchronously. The single color light source starts emission at the timing of the start of exposure of the first line of the image sensors, and continues the emission until exposure of the last line completes. At this time, it is sufficient if only the image sensors which capture images, out of the image sensor group, operate. In the case of (b) of FIG. 6, for example, it is sufficient if only the image sensors indicated by slashes (slants to the left) operate, and the three image sensors in the last row, which are outside the imaging target area image, need not operate.

In step S908, it is determined whether the exposure and the reading signals are completed for all the lines of the image sensors. The processing returns to S907 and continues until all the lines are completed. When all the lines are completed, processing advances to S909.

In step S909, it is determined whether the imaging of all the RGB images completed. If imaging of each image of RGB is not completed, processing returns to S906, and processing ends if completed.

According to these processing steps, the entire imaging target area is imaged by imaging each image of RGB 4 times respectively.

(Image Merging)

FIG. 10 is a functional block diagram depicting the image merging method. To simplify description of the image merging, the functional blocks of the two-dimensional image sensor group and the functional blocks related to the merging processing are shown separately. The functional blocks of the image merging method include two-dimensional image sensors 1001a to 1001q, color memories 1002a to 1002q, development/correction units 1003a to 1003q, sensor memories 1004a to 1004q, a memory control unit 1005, a horizontal merging unit 1006, a vertical merging unit 1007, a horizontal merging memory 1008, a vertical merging memory 1009, a compression unit 1010 and a transmission unit 1011.

Figure 11A:
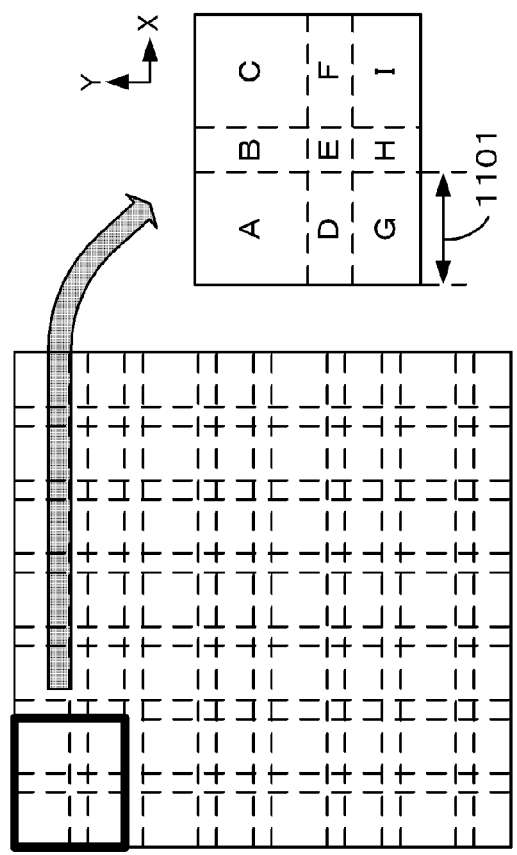
FIG. 11A and FIG. 11B are schematic diagrams depicting image merging areas.
Figure 11B:
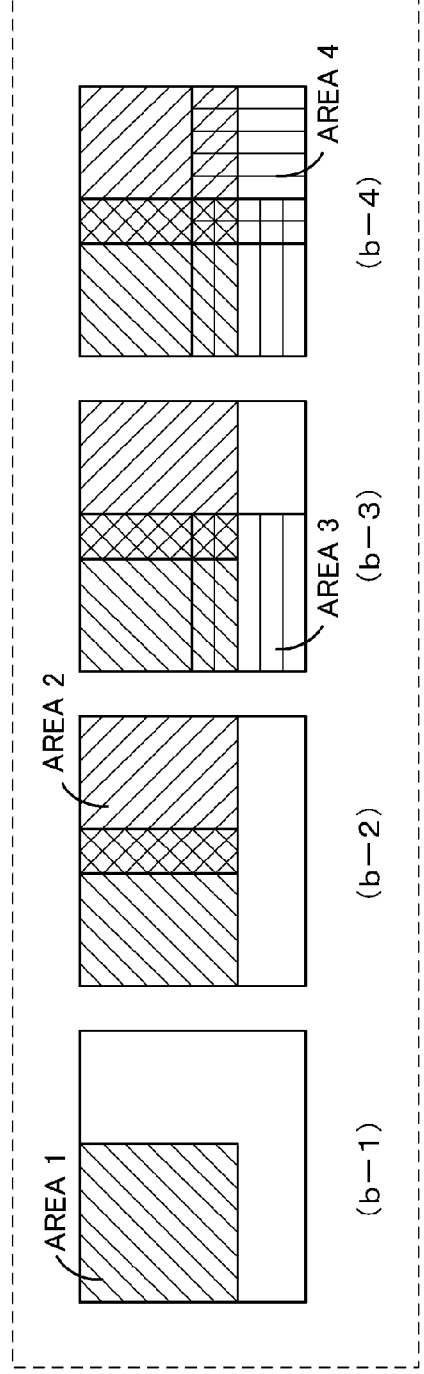
Figure 12:
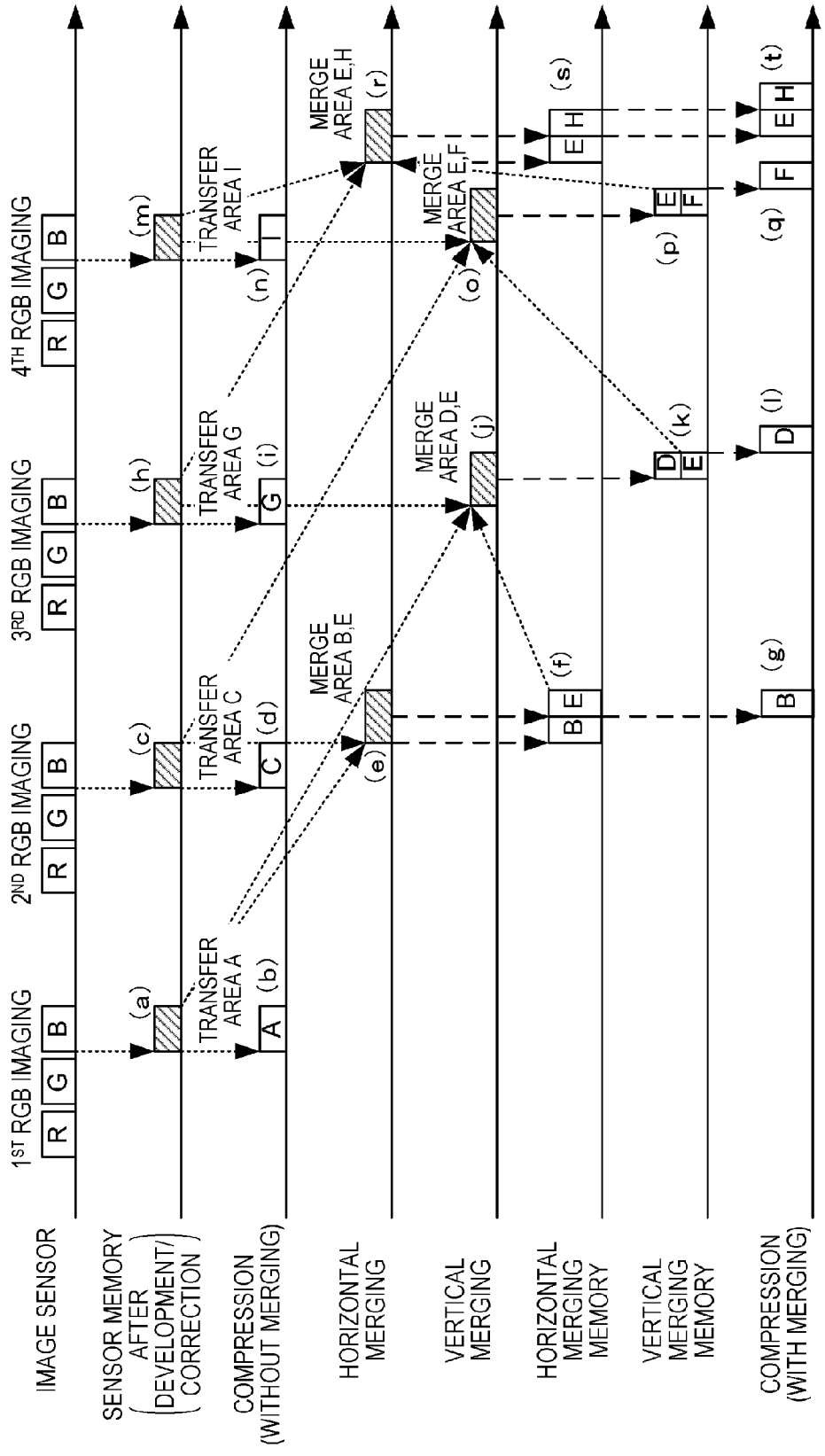
FIG. 12 is a diagram depicting an operation flow of image merging.

FIG. 10 to FIG. 12 are described based on the assumption that the horizontal reading direction (X direction) of the image sensors and the moving direction (Y direction) are perpendicular, and the positions in the Y direction of the imaging areas which are adjacent in the X direction and a number of reading pixels in the Y direction thereof roughly match, as described in FIG. 6 or FIG. 7C.

The two-dimensional image sensors 1001*a* to 1001*q* correspond to the two-dimensional image sensor group constituted by seventeen image sensors described in FIG. 4. The two-dimensional image sensors 1001*a* to 1001*q* images the entire imaging target area while changing the relative positions of the image sensor group 111*a* to 111*q* and the image target area image 110*b* on the imaging plane, as described in FIG. 6 or FIG. 7C. The color memories 1002*a* to 1002*q* are memories for storing each image signal of RGB, which are attached to the two-dimensional image sensors 1001*a* to 1001*q* respectively. Since image signals of three colors RGB are required for the development/correction units 1003*a* to 1003*q* in the subsequent step, a memory capacity that can store at least two colors of image signals, out of the R image signal, G image signal and B image signal, is necessary.

The development/correction units 1003*a* to 1003*q* perform the development processing and correction processing on the R image signal, G image signal and B image signal. The functions thereof include black level correction, DNR (Digital Noise Reduction), pixel defect correction, brightness correction due to individual dispersion of image sensors and shading, development processing, white balance processing and enhancement processing.

The sensor memories 1004*a* to 1004*q* are frame memories for temporarily storing developed/corrected image signals.

The memory control unit 1005 specifies a memory area for image signals stored in the sensor memories 1004*a* to 1004*q*, controls to transfer the image signals to one of the compression unit 1010, horizontal merging unit 1006 and vertical merging unit 1007. The operation of memory control will be described in detail with reference to FIG. 12.

The horizontal merging unit 1006 performs merging processing for image blocks in the horizontal direction. The vertical merging unit 1007 performs merging processing for image blocks in the vertical direction. The horizontal merging memory 1008 is a memory for temporarily storing image signals after the horizontal merging processing. The vertical merging memory 1009 is a memory for temporarily storing image signals after the vertical merging processing.

The compression unit 1010 sequentially performs compression processing on image signals transferred from the sensor memories 1004*a* to 1004*q*, the horizontal merging memory 1008 and the vertical merging memory 1009, for each transfer block. The transmission unit 1011 converts the electric signals of the compressed block image into light signals, and outputs the signals to a PC and WS.

Because of the above configuration, an image of the entire imaging target area can be generated from the image discretely acquired by the two-dimensional image sensors 1001*a* to 1001*q*, by the merging processing. The merging functions here include the registration correction, feature point extraction, alignment, joint correction and gamma correction for images after merging processing, but a detailed description on each processing is omitted, since a standard technology can be used.

FIGS. 11A and 11B are schematic diagrams depicting an image merging area. As described in FIG. 6 or FIG. 7C, images are discretely acquired in sequence by the two-dimensional image sensors 1001*a* to 1001*q*.

FIG. 11A is a diagram of the entire imaging target area and a diagram when a part of the entire imaging target area is extracted. Here it is shown how the imaging target area is divided and imaged spatially, ignoring the time concept. The broken line indicates the overlapped area of each captured image. For simplification, the diagram of the extracted part of the entire imaging target area will be described. Here the areas imaged by a single two-dimensional image sensor are an area 1 (A, B, D, E), an area 2 (B, C, E, F), an area 3 (D, E, G, H) and an area 4 (E, F, H, I), which are imaged at different timings respectively. In terms of accuracy, pixels for the overlapped area exist in the top portion and left portion of the area 1, the top portion and right portion of the area 2, the left portion and bottom portion of the area 3, and the right portion and bottom portion of the area 4, therefore these areas are included in the imaging area, but are omitted here in order to focus on the description of the merging of images.

In terms of concrete numeric information, the area (B, E, H) and the area (D, E, F) have a 0.192 mm width (64 pixels×3 μm), since 64 pixels are assumed to be around the two-dimensional image sensor as the pixels for merging processing. The width 1101 of the light receiving area of a single two-dimensional image sensor, excluding the overlapped area, is 22.9 mm. In FIG. 11A and FIG. 11B, the overlapped area is depicted with exaggeration.

FIG. 11B illustrates how the imaging area is acquired as an image when the areas 1 to 4 are acquired in the time sequence of (b-1) to (b-4), as described in FIG. 6 or FIG. 7C. In (b-1), the area 1 (A, B, D, E) is imaged and acquired as an image. In (b-2), the area 2 (B, C, E, F) is imaged and acquired as an image. Here the area (B, E) is an area imaged as overlapping, and is an area where image merging processing in the horizontal direction is performed. In (b-3), the area 3 (D, E, G, H) is imaged and acquired as an image. Here, the area (D, E) is an area imaged as overlapping. In (b-2) the image merging processing in the vertical direction is performed for the area (D, E), assuming that one image of the area (A, B, C, D, E, F) has been acquired. In this case, the X direction is the horizontal read direction of the two-dimensional image sensors, so image merging processing in the vertical direction can be started without acquiring the images of all of the area 3 (D, E, G, H). In (b-4), the area 4 (E, F, H, I) is imaged and acquired as an image. Here the area (E, F, H) is an area imaged as overlapping. In (b-3), image merging processing in the vertical direction for the area (E, F) and image merging processing in the horizontal direction for the area (E, H) are performed sequentially, assuming that one image of the area (A, B, C, D, E, F, G, H) has been acquired. In this case, the X direction is the horizontal read direction of the two-dimensional image sensors, so image merging processing in the vertical direction can be started without acquiring all of the images of the area 4 (E, F, H, I).

The number of read pixels in the Y direction is roughly the same for the adjacent imaging areas in the X direction, therefore the image merging processing can be performed for each area (A to I) and the applied range can be easily expanded to the entire imaging target area. Since the imaging areas are acquired in such a ways as the image sensor group sequentially filling the imaging target area image along the Y direction, the image merging processing can be implemented with simple memory control.

A partial area extracted from the entire imaging target area was used for description, but the description on the areas where image merging is performed and the merging direction can be applied to the range of the entire imaging target area.

(Operation Flow of Image Merging)

FIG. 12 is a diagram depicting an operation flow of image merging. The time axis is shown for each functional block, illustrating how the areas A to I described in FIG. 11A are processed as time elapses. In this example, light sources are emitted in the sequence of R, G and B. Control here is performed by the memory control unit 1005.

In (a), the R image and G image are captured for the first time, and in a state where the R image and the G image are stored in the color memories 1002*d* to 1002*q* respectively, and the B image is captured and sequentially read. In the development/correction units 1003*d* to 1003*q*, the R image and the G image are read from the color memories 1002*d* to 1002*q* synchronizing with the B image which is read from the two-dimensional image sensors 1001*d* to 1001*q*, and development and correction processing is sequentially performed. An image on which the development and correction processing was performed is sequentially stored in the sensor memories 1004*d* and 1004*q*. The images stored here are the area (A, B, D, E).

In (b), the image of area (A), out of the area (A, B, D, E) stored in the sensor memories 1004*d* to 1004*q*, is transferred to the compression unit 1010. The merging processing is not performed for the area (A).

In (c), the R image and G image are captured for the second time, and in a state where the R image and the G image are stored in the color memories 1002*a* to 1002*n* respectively, and the B image is captured and sequentially read. In the development/correction units 1003*a* to 1003*n*, the R image and the G image are read from the color memories 1002*a* to 1002*n*, synchronizing with the B image which is read from the two-dimensional image sensors 1001*a* to 1001*n*, and development and correction processing is sequentially performed. An image on which the development and correction processing was performed is sequentially stored in the sensor memories 1004*a* to 1004*n*. The images stored here are the area (B, C, E, F).

In (d), the image of the area (c), out of the area (B, C, E, F) stored in the sensor memories 1004*a* to 1004*n*, is transferred to the compression unit 1010. The merging processing is not performed for the area (c).

In (e), the image of the area (B, E) is read from the sensor memories 1004*a* to 1004*q*, and image merging processing in the horizontal direction is performed.

In (f), the image after the image merging processing in the horizontal direction is sequentially stored in the horizontal merging memory 1108.

In (g), the image of the area (B) stored in the horizontal merging memory 1108 is transferred to the compression unit 1010.

In (H), the R image and G image are captured for the third time, and in a state where the R image and G image are stored in the color memories 1002*d* to 1002*q* respectively, and the B image is captured and sequentially read. In the development/correction units 1003*d* to 1003*q*, the R image and the G image are read from the color memories 1002*d* to 1002*q*, synchronizing with the B image which is read from the two-dimensional image sensors 1001*d* to 1001*q*, and the development and correction processing is sequentially performed. An image on which the development and correction processing was performed is sequentially stored in the sensor memories 1004*d* to 1004*q*. The image stored here is the area (D, E, G, H).

In (i), the image of the area (G), out of the area (D, E, G, H) stored in the sensor memories 1004*d* to 1004*q* in (h), is transferred to the compression unit 1010. The merging processing is not performed for the area (G).

In (j), the image of the area (D, E) is read from the sensor memories 1004*d* to 1004*q*, and the horizontal merging memory 1008, and the image merging processing in the vertical direction is performed.

In (k), the image after the image merging processing in the vertical direction is sequentially stored in the vertical merging memory 1009.

In (l), the image of the area (D) stored in the vertical merging memory 1009 is transferred to the compression unit 1010.

In (m), the R image and G image are captured for the fourth time, and in a state where the R image and the G image are stored in the color memories 1002*a* to 1002*n* respectively, and the B image is captured and sequentially read. In the development/correction units 1003*a* to 1003*n*, the R image and the G image are read from the color memories 1002*a* to 1002*n*, synchronizing with the B image which is read from the two-dimensional image sensors 1001*a* to 1001*n*, and the development and correction processing is sequentially performed. An image on which the development and correction processing was performed is sequentially stored in the sensor memories 1004*a* to 1004*n*. The image stored here is the area (E, F, H, I).

In (n), the image of the area (I), out of the area (E, F, H, I) stored in the sensor memories 1004*a* to 1004*n* in (m), is transferred to the compression unit 1010. The merging processing is not performed for the area (I).

In (o), the image of the area (E, F) is read from the sensor memories 1004*a* to 1004*n* and the vertical merging memory 1009, and the image merging processing in the vertical direction is performed.

In (p), the image after the image merging processing in the vertical direction is sequentially stored in the vertical merging memory 1009.

In (q), the image of the area (F) stored in the vertical merging memory 1009 is transferred to the compression unit 1010.

In (r), the image of the area (E, H) is read from the sensor memories 1004*a* to 1004*q* and the vertical merging memory 1009, and image merging processing in the horizontal direction is performed.

In (s), the image after the image merging processing in the horizontal direction is sequentially stored in the horizontal merging memory 1008.

In (t), the image of the area (E, H) stored in the horizontal merging memory 1008 is sequentially transferred to the compression unit 1010.

In this way, the sequential merging processing can be performed by the memory control unit 1005 controlling the memory transfer, and the image of the entire imaging target area can be transferred to the sequential compression unit 1010.

Here the sequence of compression without merging processing was described for the areas (A), (C), (G) and (I), but the sequence of compression after joining areas with which the areas (A), (C), (G) and (I) are merged, can also be implemented.

(Imaging Time)

Time required for imaging the entire imaging target area will now be described. As mentioned above, the main object of the present invention is imaging the imaging target area with minimum number of times of moving by appropriately arranging the image sensor group while considering the dead zones (package frames). Now how decreasing a number of times of moving is effective for decreasing the imaging time will be described.

Figure 13:
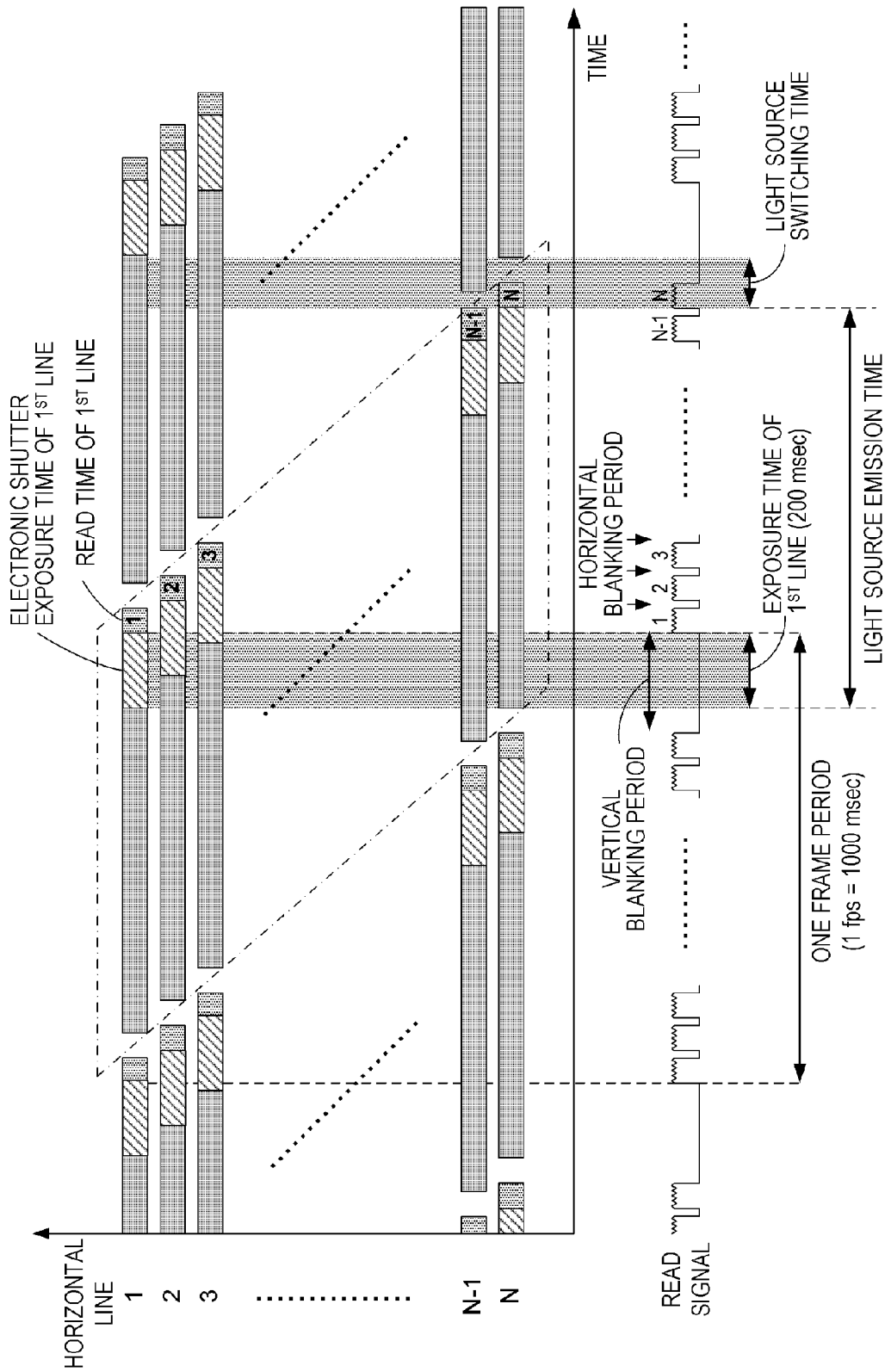
FIG. 13 is a diagram depicting a shutter method of a two-dimensional CMOS imaging sensor.

FIG. 13 is a diagram depicting a shutter method of a two-dimensional CMOS image sensor. The ordinate in the upper portion is a horizontal line of the two-dimensional sensors, and the abscissa is time. In the lower portion, timing of read signals is shown, and the time axis of the upper portion and that of the lower portion match.

Since a rolling shutter method is assumed for the present embodiment, a discrepancy is generated in the read time of each line. The read time shifts by almost one frame between the first horizontal line and the last horizontal line. In order to sequentially capture each image of an RGB without a time delay by the rolling shutter method, the exposure time becomes shorter than one frame period, since the emission wavelength of the light source cannot be switched during the exposure period from the first horizontal line to the last horizontal line of this frame. FIG. 13 illustrates a case when the exposure time is 200 msec. at a frame rate of 1 fps (1000 msec.). The light source emission time is almost 1000 msec. at each wavelength, and each image of RGB is captured by sequentially switching the wavelength without time delay. For the read signals from the two-dimensional image sensors as well, each image signal of RGB is sequentially output without a time delay.

By executing the light source control and exposure control described above, each image signal of RGB can be sequentially output from the two-dimensional image sensors without a time delay.

Here the case of using a two-dimensional CMOS image sensor as the two-dimensional image sensor was described. Compared with a CCD image sensor, a CMOS image sensor has the advantage of decreasing the imaging time since high-speed operation is possible. The case of using a rolling shutter method, instead of a global shutter method, was described as the shutter method. This is because the rolling shutter method has the advantage in noise reduction, and can contribute to improving the image quality of the captured images. In the present invention, the CMOS image sensor and the rolling shutter method were set, but the present invention is not limited to this, but can also be implemented with a global shutter method or a mechanical shutter method with a CCD image sensor or CMOS image sensor.

Figure 14:
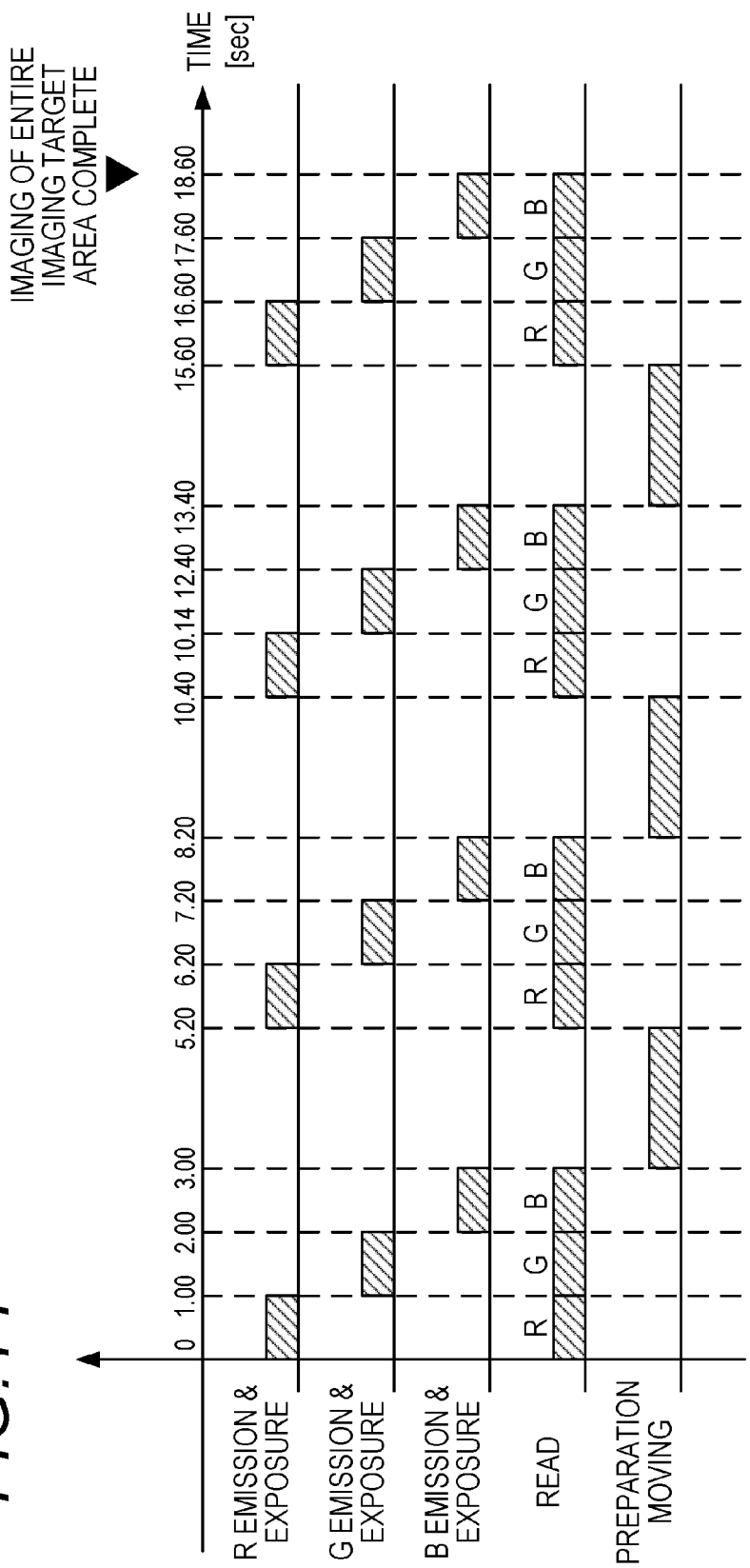
FIG. 14 is a time chart depicting a sequence of imaging the entire imaging target area.

FIG. 14 is a time chart depicting a sequence of imaging the entire imaging target area. Emission of light source of each RGB, exposure thereof, reading each image signal of RGB, moving the preparation and respective time axis are illustrated, and a sequence along with the elapse of time is shown. This is the same as the flow chart of the imaging flow described in FIG. 9, but is shown using the time axis.

If the frame rate of the two-dimensional image sensor is 1 fps (1000 msec.), it takes 3.0 sec. to read the RGB image signals in the first imaging. The preparation must be moved about 3 mm by the moving mechanism, and if this moving time is assumed to be 2.2 sec., then imaging of the entire imaging target area takes 18.6 sec.

If a number of times of moving the preparation is decreased by 1, that is, if a number of times of imaging is decreased by 1, the imaging time can be decreased by 5.2 sec. (=3.0 sec.+ 2.2 sec.). This is 28% of the total imaging time (=5.2 sec./18.6 sec.) if the numeric values of the present embodiment are used.

In other words, the imaging time can be decreased dramatically if the imaging target area can be imaged with a minimum number of times of moving.

In a present embodiment, color sequential imaging using a light source having three wavelengths of RGB is assumed, but the imaging method is not limited to this, but may be imaging by two-dimensional image sensors having a white light source and an RGB Bayer arrangement or complementary color arrangement.

Comparison Example

Thus far, an example of an image sensor group, where the imaging target area image 110b is divided into an odd number of sections (7 in the case of this embodiment) on the imaging plane on the axis (X axis) perpendicular to the moving axis, was described, in order to minimize (4 times in the case of this embodiment) the number of times of imaging (number of the preparation is moved) was described (see FIG. 4). Now an example of an image sensor group where the imaging target area image 110b is divided into an even number of sections (e.g. 6) on the imaging plane on the axis (X axis) perpendicular to the moving axis, will be described as comparison example 1.

Figure 15A:
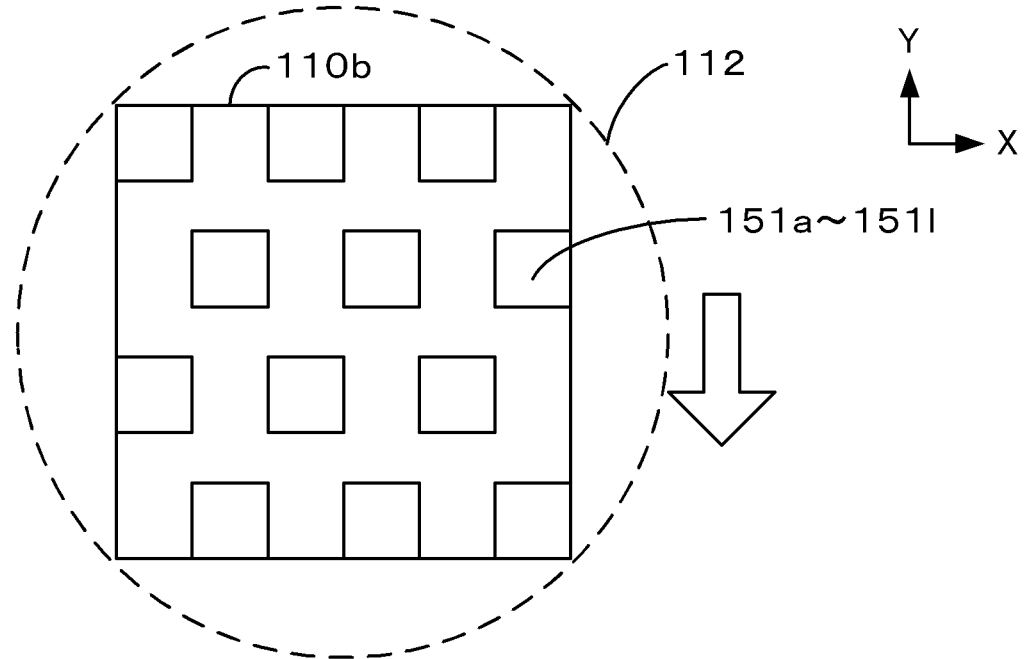

FIG. 15A and FIG. 15B are schematic diagrams depicting a method for imaging the entire imaging target area with a plurality of times of uniaxial imaging when the imaging target area image is divided into an even number of sections by the two-dimensional image sensors. FIG. 15A illustrates a positional relationship of the image sensor group 151a to 151l, and the imaging target area image 110b on the imaging plane. The relative positions of the image sensor group 151a to 151l and the imaging target area image 110b on the imaging plane change in the arrow direction (Y direction) by the moving mechanism disposed at the preparation side. FIG. 15B is a diagram depicting how the image sensor groups 151a to 151l capture the imaging target area image 110b. (a) in FIG. 15B shows an area acquired by the first imaging in solid black. In the first imaging, each image of RGB is acquired by switching the emission wavelength of the light source. (b) in FIG. 15B shows an area acquired by the second imaging after the preparation is moved by the moving mechanism in slashes (slants to the left). (c) in FIG. 15B shows an area acquired by the third imaging in inverted slashes (slanted to the right), and (d) in FIG. 15B shows an area acquired by the fourth imaging in mesh. The white areas at three locations indicated by arrow marks are areas that cannot be imaged by the 4 times of imaging (the preparation is moved by the moving mechanism 3 times).

This is because in the case of division by an even number, a two-dimensional image sensor is located at one of the four corners of the imaging target area image 110b on the imaging plane, and unlike division by an odd number, the image sensor group on the moving axis (Y axis) cannot be disposed outside the imaging target area image 110b on the imaging plane.

Therefore in the case of dividing the imaging target area image into an even number of sections by the two-dimensional image sensor, 5 times of imaging (the preparation is moved by the moving mechanism 4 times) by the image sensor group is required to image the entire imaging target area, and it takes time for imaging.

Now a problem when the image sensor size, including the dead zone, is 1.5 times or longer both vertically and horizontally than the size of the effective light receiving area, will be described using other comparison examples 2 and 3. When there is this restriction, the entire imaging target area cannot be imaged by 3 or 4 times of imaging (the preparation is moved 2 or 3 times) if the image sensor group is disposed only in the imaging target area image 110b on the imaging plane.

FIGS. 16A, 16B and FIGS. 17A, 17B are schematic diagrams depicting imaging the entire imaging target area by a plurality of uniaxial imaging when the image sensor group is disposed in the imaging target area image 110b on the imaging plane.

Figure 16A:
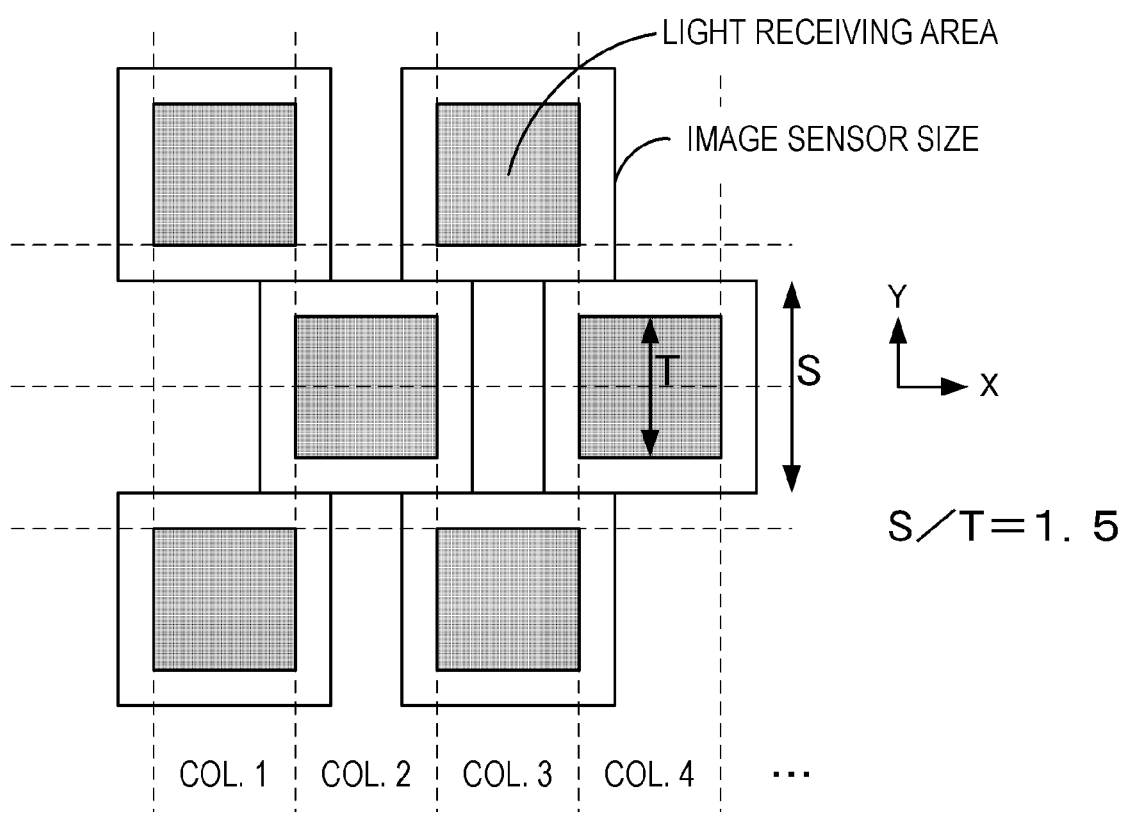

FIG. 16A shows a comparison example 2 where S/T=1.5 is established, where T is a length of an image sensor in the Y direction, and S is a length of the image sensor in the Y direction including the dead zone.

FIG. 16A illustrates the ratio of the image sensor size and light receiving area in a part extracted from the image sensor group. FIG. 16B is a diagram depicting how the image sensor group captures the imaging target area image 110b. (a) in FIG. 16B shows an area acquired by the first imaging in solid black. In the first imaging, each image of RGB is acquired by switching the emission wavelength of the light source. (b) in FIG. 16B shows an area acquired by the second imaging after the preparation is moved by the moving mechanism in slashes (slants to the left). (c) in FIG. 16B shows an area acquired by the third imaging in inverted slashes (slants to the right), and (d) in FIG. 16B shows an area acquired by the fourth imaging in mesh.

The above is the case of S/T=1.5, but if S/T≤1.5, the entire imaging target area can be imaged by 4 or less number of times of imaging (the preparation is moved by the moving mechanism 3 times or less).

Figure 17A:
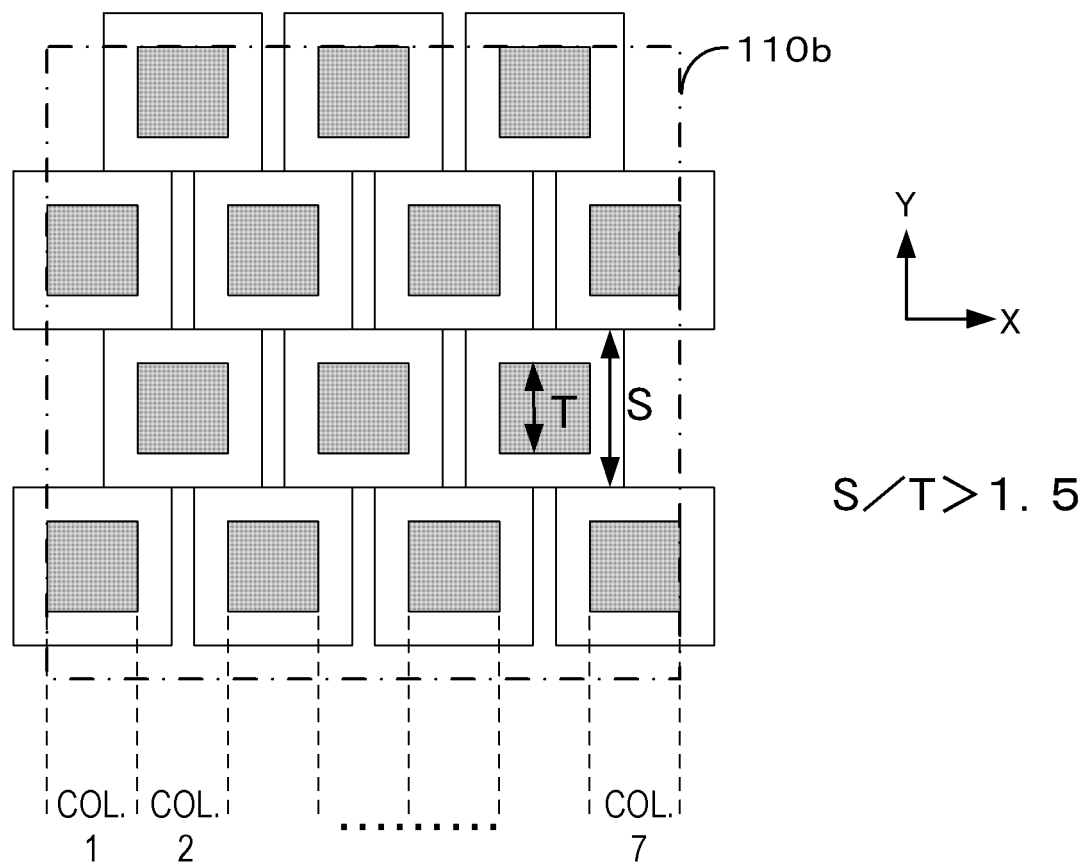
FIG. 17A and FIG. 17B are schematic diagrams depicting an imaging procedure of a comparison example 3.

FIG. 17A shows a comparison example 3 when S/T>1.5 is established.

Figure 17B:
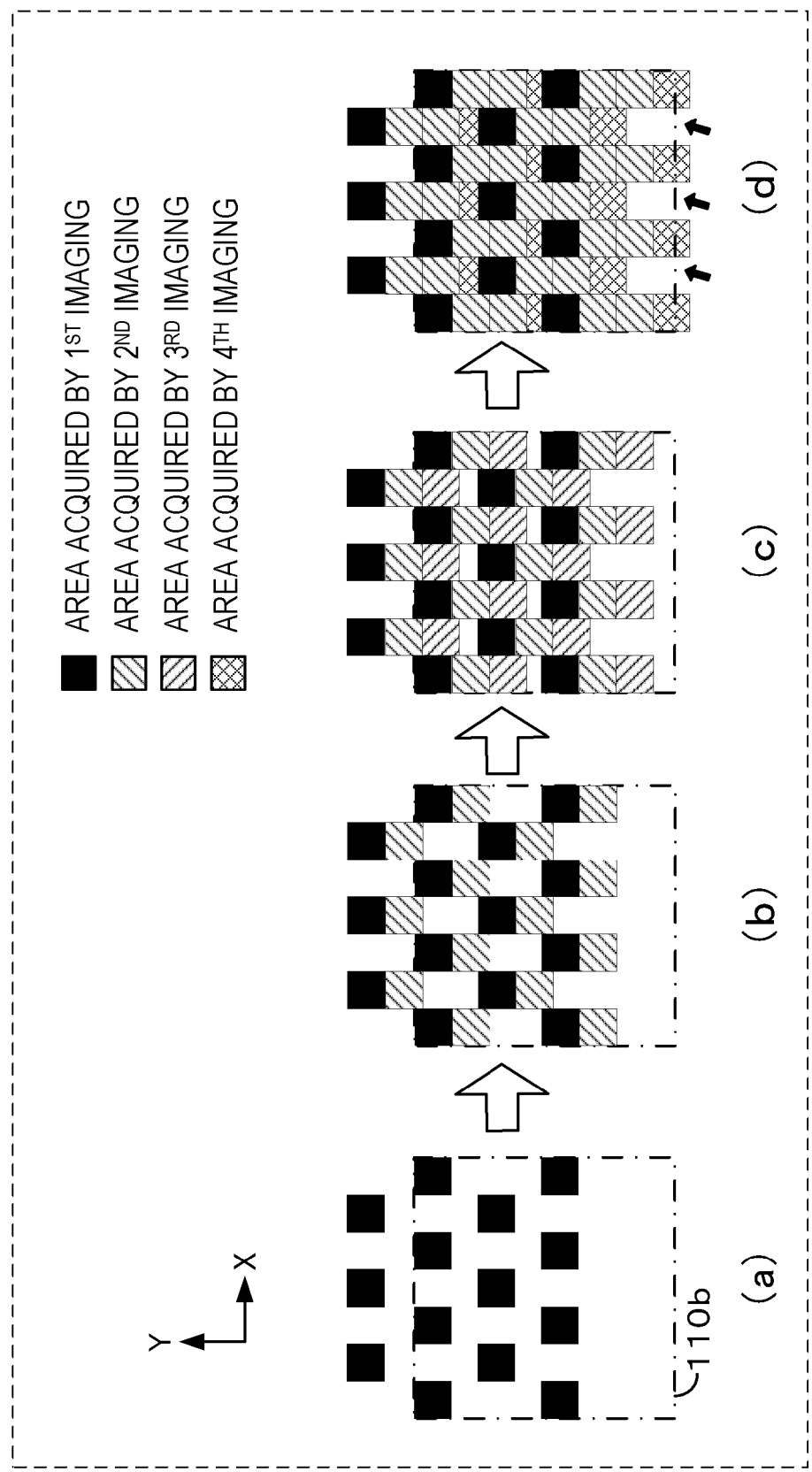

FIG. 17A illustrates a positional relationship of the image sensor group and the imaging target area image 110b on the imaging plane. FIG. 17B is a diagram depicting how the image sensor group captures the imaging target area image 110b. (a) in FIG. 17B shows an area acquired by the first imaging in solid black. In the first imaging, each image of RGB is acquired by switching the emission wavelength of the light source. (b) in FIG. 17B shows an area acquired by the second imaging after the preparation is moved by the moving mechanism in slashes (slants to the left). (c) in FIG. 17B shows an area acquired by the third imaging in inverted slashes (slants to the right), and (d) in FIG. 17B shows an area acquired by the fourth imaging in mesh. The white areas at 3 locations indicated by arrow marks are areas that cannot be imaged by the 4 times of imaging (the preparation is moved by the moving mechanism 3 times).

This is because a number of image sensors that can be disposed on column 2 is less in FIG. 17A compared with FIG. 16A, due to the restriction that the image sensor group is disposed only within the imaging target area image 110b on the imaging plane.

Therefore if the image sensor size including the dead zone is larger than 1.5 times of the effective light receiving area, and if the image sensor group is disposed only within the imaging target area image 110b on the imaging plane, 5 times of imaging is required to obtain the image of the entire imaging target area. This is because in the case of S/T>1.5, it is difficult to arrange the image sensor group, and improvement described in the present embodiment is required.

As described above, according to the arrangement of the image sensors of the present embodiment, the entire imaging target area can be imaged with a minimum number of times of moving, and imaging time can be decreased under the condition of the uniaxial moving of the preparation and the presence of the dead zone with S/T>1.5.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-201280, filed on Sep. 8, 2010, which is hereby incorporated by reference herein in its entirety.

What is claimed is:

1. An imaging apparatus, comprising:
a supporting plate which supports a sample;
a light source which irradiates light onto an imaging target area on the supporting plate;
an imaging unit on which a plurality of image sensors having a light receiving area respectively are discretely disposed on an image plane two-dimensionally in an X direction and a Y direction;
an imaging optical system which guides light from the imaging target area and forms an imaging target area image corresponding to the imaging target area on the imaging plane of the imaging unit;
a moving unit which relatively moves the imaging target area image and the plurality of image sensors in the Y direction in order to perform a plurality of times of imaging for the imaging target area image while changing a position of an imaging area of each of the image sensors; and
a merging unit which merges images of imaging areas acquired by the plurality of times of imaging and generates an image of the entire imaging target area, wherein
a size of an effective field of view of the imaging optical system is larger than a size of the imaging target area image,
when x1 is a length in the X direction and y1 is a length in the Y direction of the imaging target area image,
x2 is a length in the X direction and y2 is a length in the Y direction of the image sensor, and
x3 is a length in the X direction and y3 is a length in the Y direction of the light receiving area,
$1.5 < x2/x3 < 2.0$, $1.5 < y2/y3 < 2.0$, and $x3 \geq x1/m$ (m is 3 or greater odd number) are satisfied,
the plurality of image sensors are arranged so that odd rows and even rows are alternately disposed in the Y direction at a pitch not less than y2 and not greater than 2*y3, each of the odd rows being constituted by (m−1)/2 number of image sensors lined up in the X direction at 2*1/m pitch, each of the even rows being constituted by (m+1)/2 number of image sensors lined up in the X direction at 2*1/m pitch with a 1/2 phase shift with respect to the odd row, and
the length in the Y direction of an area covering light receiving areas of the image sensors on the first row to the light receiving areas of the image sensors on the last row is longer than the length y1 in the Y direction of the imaging target area image.

2. The imaging apparatus according to claim 1, wherein at least a part of the light receiving areas of the plurality of image sensors is disposed inside the effective field of view.

3. The imaging apparatus according to claim 1, wherein the moving unit moves the supporting plate.

4. The imaging apparatus according to claim 1, wherein two adjacent imaging areas in the X direction match in a position in the Y direction and the number of read pixels in the Y direction.

5. The imaging apparatus according to claim 1, wherein the moving unit relatively moves the imaging target area image and the plurality of image sensors in the Y direction, so that an imaging area of each of the image sensors sequentially fills the imaging target area image along the Y direction.

6. The imaging apparatus according to claim 1, wherein
when N is the number of times of imaging to image the entire imaging target area (N is an integer 2 or greater),
B is a maximum length of an overlapped area in two adjacent imaging areas in the Y direction for merging processing, and
M is the number of even rows of the plurality of image sensors,
the length y3 in the Y direction of the light receiving area of each of the image sensors satisfies:

$$y1/(M*N) \leq y3 \leq y1/(M*N)+B.$$

7. An imaging apparatus, comprising:
a supporting plate which supports a sample;
a light source which irradiates light onto an imaging target area on the supporting plate;

an imaging unit on which a plurality of image sensors having a light receiving area respectively are discretely disposed on an imaging plane two dimensionally in an X direction and a Y direction;

an imaging optical system which guides light from the imaging target area and forms an imaging target area image corresponding to the imaging target area on an imaging plane of the imaging unit;

a moving unit which relatively moves the imaging target area image and the plurality of image sensors in the Y direction in order to perform a plurality of times of imaging for the image target area image while changing a position of an imaging area of each of the image sensors; and a merging unit which merges images of imaging areas acquired by the plurality of times of imaging and generates an image of the entire imaging target area, wherein a size of an effective field of view of the imaging optical system is larger than a size of the imaging target area image, a size of the image sensor is larger than 1.5 times and smaller than 2 times a size of the light receiving area, the plurality of image sensors are arranged so that odd rows and even rows are alternately disposed in the Y direction at a predetermined pitch, each of the odd row being constituted by image sensors lined up in the X direction at a predetermined pitch, each of the even rows being constituted by image sensors, more than that of the odd row by 1, lined up in the X direction at the same pitch as the odd row with a 1/2 phase shift with respect to the odd row, light receiving areas of image sensors on both ends of the even row include both ends in the X direction of the imaging target area image respectively, and a length in the Y direction of an area covering the light receiving areas of the image sensors on the first row to the light receiving areas of the image sensors on the last row is longer than a length in the Y direction of the imaging target area image.

* * * * *